US012617123B2

(12) United States Patent
Jones et al.

(10) Patent No.: US 12,617,123 B2
(45) Date of Patent: May 5, 2026

(54) SLURRY ROLLER CONVEYOR FOR GYPSUM BOARD MANUFACTURE

(71) Applicant: KNAUF GIPS KG, Iphofen (DE)

(72) Inventors: Nicholas Stephen Jones, Valparaiso, IN (US); Leslie Leamon Eversole, Milton, PA (US); Ronald Edward Schenck, Valparaiso, IN (US)

(73) Assignee: KNAUF GIPS KG, Iphofen (DE)

( * ) Notice: Subject to any disclaimer, the term of this patent is extended or adjusted under 35 U.S.C. 154(b) by 115 days.

(21) Appl. No.: 18/764,918

(22) Filed: Jul. 5, 2024

(65) Prior Publication Data

US 2025/0170756 A1 May 29, 2025

Related U.S. Application Data

(60) Provisional application No. 63/603,842, filed on Nov. 29, 2023.

(51) Int. Cl.
*B28B 19/00* (2006.01)

(52) U.S. Cl.
CPC ................................ *B28B 19/0092* (2013.01)

(58) Field of Classification Search
CPC ....... B28B 19/0092; B28B 5/02; B28B 1/526; B28B 13/0275; B28B 2013/0265; C04B 2111/0062
See application file for complete search history.

(56) References Cited

U.S. PATENT DOCUMENTS 5,643,510 A 7/1997 Sucech
5,683,635 A 11/1997 Sucech et al.
6,494,609 B1 12/2002 Wittbold et al.
6,874,930 B2 4/2005 Wittbold et al.
6,986,812 B2 1/2006 Dubey et al.
7,007,914 B2 3/2006 Petersen et al.
7,296,919 B2 11/2007 Petersen et al.
8,770,139 B2 7/2014 Frank et al.
9,616,591 B2 4/2017 Li et al.
(Continued)

FOREIGN PATENT DOCUMENTS

CN 109664393 A 4/2019
DE 29824114 U1 5/2000
(Continued)

OTHER PUBLICATIONS

International Search Report and Written Opinion of the International Searching Authority mailed Feb. 17, 2025 to United States Gypsum Company for International Application No. PCT/US2024/056994 filed Nov. 22, 2024.

*Primary Examiner* — Vishal I Patel
(74) *Attorney, Agent, or Firm* — Pradip Sahu; Maryellen Feehery Hank

(57) ABSTRACT

A slurry distributing device including a roller conveyer having a series of roller sections, each section driven by a respective motor and employing a combination of direct drive and belt drive. The slurry distributing device is used for the uniform and low-speed flow distribution of slurries. The invention also relates to a conveyor line for the continuous production of gypsum drywall boards employing the slurry distributing device. The invention also relates to a method for the continuous production of gypsum drywall boards employing the slurry distributing device.

6 Claims, 14 Drawing Sheets

(56) References Cited

U.S. PATENT DOCUMENTS

| | | | |
|---|---|---|---|
| 9,909,718 B2 | 3/2018 | Wittbold et al. | |
| 9,999,989 B2 | 6/2018 | Rago et al. | |
| 10,052,753 B2 | 8/2018 | Ni et al. | |
| 10,076,853 B2 | 9/2018 | Wittbold et al. | |
| 10,239,230 B2 | 3/2019 | Li et al. | |
| 10,286,572 B2 | 5/2019 | Li et al. | |
| 10,421,250 B2 | 9/2019 | Li et al. | |
| 10,946,549 B2 * | 3/2021 | Karakoussis | B28B 19/0092 |
| 2012/0207989 A1 | 8/2012 | Xu et al. | |
| 2013/0098268 A1 | 4/2013 | Li et al. | |
| 2015/0183583 A1 * | 7/2015 | Specht | B65G 13/02 198/790 |

FOREIGN PATENT DOCUMENTS

| | | | |
|---|---|---|---|
| EP | 3152022 | B1 | 8/2021 |
| JP | S516947 | B1 | 3/1976 |
| WO | 2012092582 | A1 | 7/2012 |
| WO | 2015185143 | A1 | 12/2015 |
| WO | 2015185251 | A1 | 12/2015 |

* cited by examiner

FIG. 7A
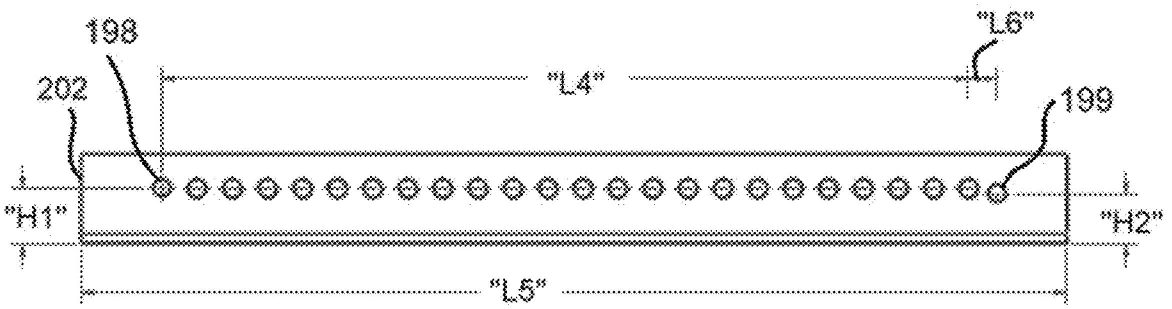
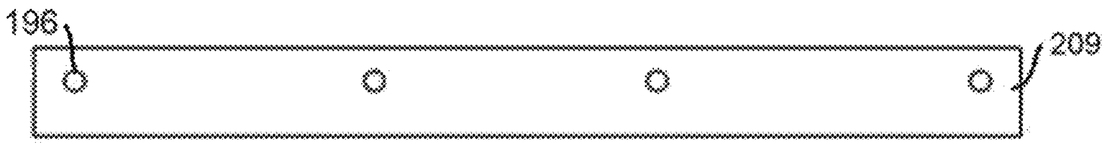
FIG. 7B
FIG. 8A
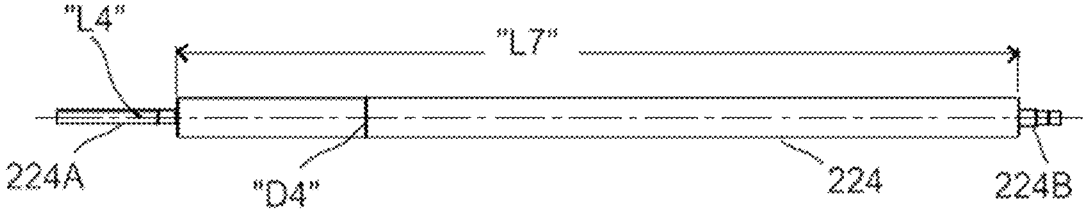
FIG. 8B
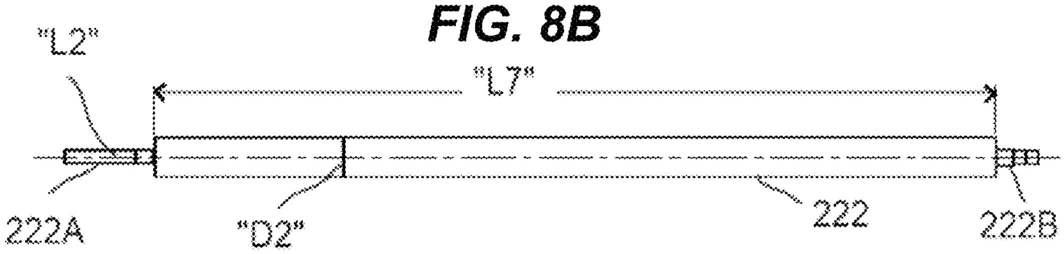
FIG. 8C
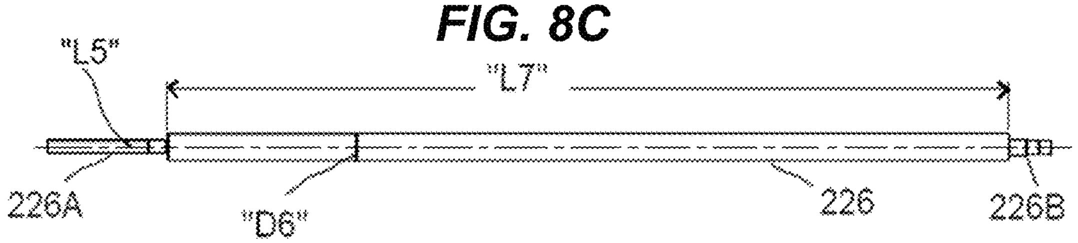

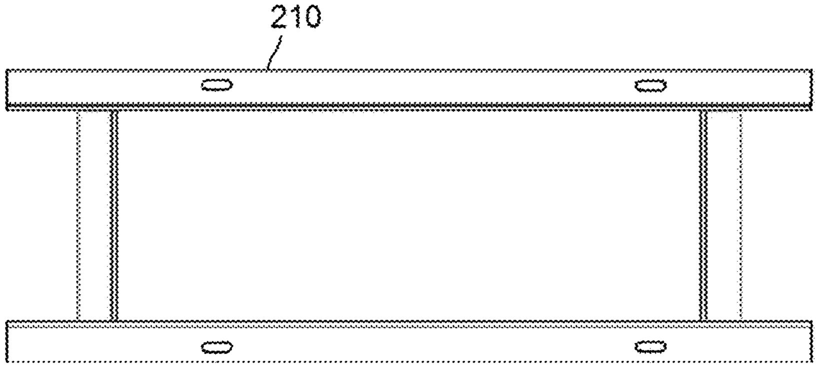
FIG. 9
FIG. 10A
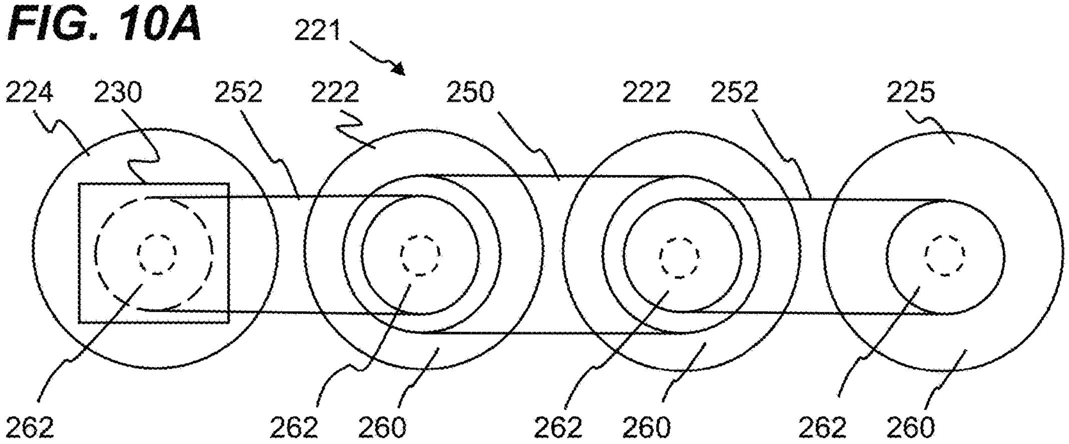
FIG. 10B
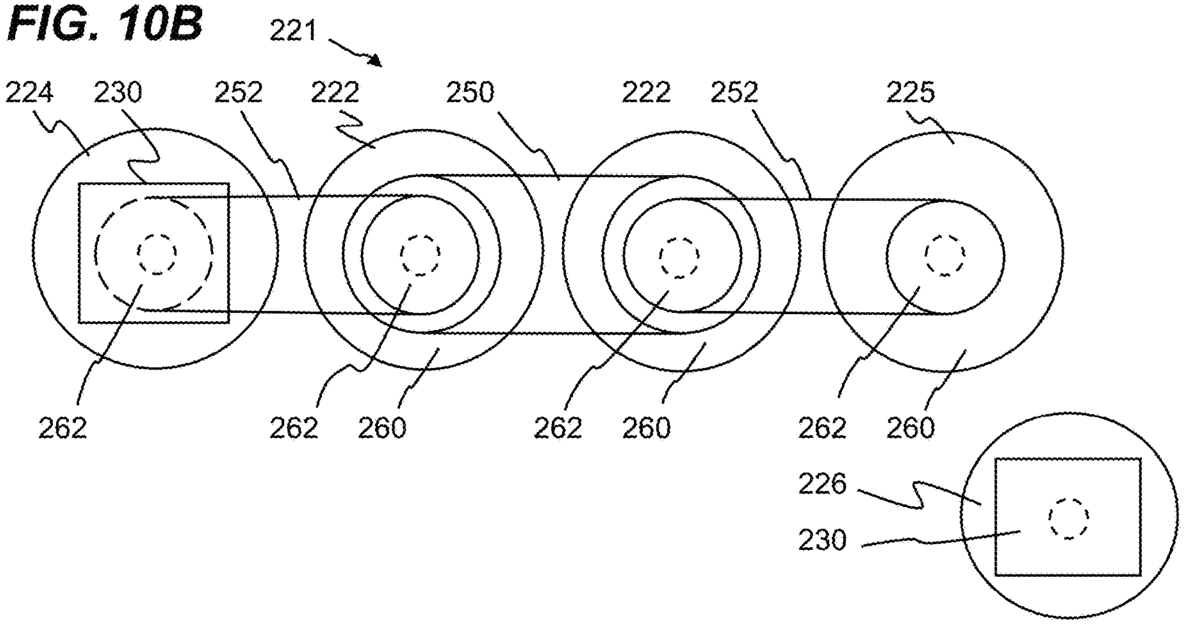

SLURRY ROLLER CONVEYOR FOR GYPSUM BOARD MANUFACTURE

FIELD OF THE INVENTION

This invention relates to a slurry distribution roller device for the production of drywall boards. In particular, the invention relates to a distributing device for the uniform distribution of suspensions or slurries and system for gypsum board manufacture using the slurry distribution roller device. The invention may also relate to the use of the slurry distributing device comprising the roller conveyor comprising parallel rotatable rollers in an apparatus and a method for gypsum board manufacture.

BACKGROUND OF THE INVENTION

Drywall boards, for example based on gypsum, are typically produced by continuous production processes. A slurry comprising the solid and the liquid components, essentially calcined gypsum, water and additives, is first produced in a mixer. The slurry is optionally foamed mechanically or chemically. The slurry is then deposited on a facer sheet or directly on a belt. Paper or nonwoven fabric are typically used as facer materials.

If a multilayer drywall board is to be produced, a plurality of layers of identical or different slurries are deposited upon one another. Located in the middle of the board is the so-called core layer, which typically makes up 50 to 90 wt.-% of the total mass of the plasterboard. When a plurality of mixers is used, the core layer is fed from the main mixer. During the setting of the material, a forming station is usually passed through, said forming station ensuring that a clean edge formation takes place. The endless strip thus produced is then cut into pieces. The excess (hyperstoichiometric) water, which has not reacted with the calcined gypsum, is expelled in a drying station.

If the drywall board has a multilayer structure, a plurality of layers of slurry have to be deposited upon one another in production. For this purpose, the slurry is often deposited on a lower layer by means of one or more hoses. When the slurry strikes the lower layer, it has a speed dependent on the cross-section of the delivery hose and on the delivery pressure. In order to achieve a good bond between the individual plies or layers, the next layer is deposited before the preceding layer has fully set or hardened. However, this has the drawback that the preceding layer is not yet stable at the time of deposition of the next layer. It can easily be damaged, i.e. so-called flushing effects can occur in the region of the deposition of the slurry. Initially uniformly deposited material of the layer lying beneath is flushed away or displaced in the region of the subsequently fed material and accumulates at other points of the board, in particular in its edge regions. The formation of layers is therefore nonuniform. The flushing effect may be more or less pronounced depending on the delivery pressure, the cross-section of the delivery hoses, the positioning of the discharge hoses and the impact angle of the slurry on the layer lying beneath.

These flushing effects occur especially in the case of thin layers that are deposited directly on the casing material. Such layers are referred to as boundary layers. Since these layers often have special functions, for example a fire protection function or increased water resistance, weak points in these functions arise in the areas in which the material has been washed away. The quality of the end products is thus markedly reduced.

Prior devices and methods for addressing some of the operational problems associated with the production of gypsum wallboard are disclosed in the following:

- U.S. Pat. Nos. 5,683,635; 5,643,510; 6,494,609; 6,874,930; 7,007,914; and 7,296,919; 9,999,989 to Rago et al.
- U.S. Pat. No. 10,076,853 to Wittbold et al.; U.S. Pat. No. 9,909,718 to Wittbold et al.
- U.S. Pat. No. 10,286,572 to Li et al.; U.S. Pat. No. 10,052,753 to Li et al.; U.S. Pat. No. 10,239,230 to Li et al.; U.S. Pat. No. 9,616,591 to Li et al.
- WO2015/185251-A1 to Martin et al and WO2015/185143-A1 (corresponding to EP 3152022 B1) to Martin et al.

Various distributor devices are known that are intended to counteract the occurrence of these flushing effects and to promote a more uniform layer deposition. In principle, it is the aim of all methods to reduce the discharge pressure in the delivery hoses, especially of the main mixer. This can be achieved by reducing the flow rates in the discharge hoses, in that the hose diameter or the number of discharge hoses is increased. The core material is typically discharged from the main mixer with one hose and then distributed into boot with one discharge leg and can be increased up to three legs to help spread the slurry onto the paper or discharged from the main mixer with three up to a maximum of four hoses. The number of discharge hoses cannot be increased arbitrarily. It is limited by the geometry of the mixer.

Both measures, the enlargement of the hose diameter and the increase in the number of discharge hoses, lead to an improvement in the flushing effect, but they do not remove it sufficiently. Moreover, they lead to increased maintenance outlay for cleaning work.

A further individual measure for improving the situation consists in depositing the gypsum discharges from the main mixer not in a pointwise manner via individual hoses, but rather distributed over the width of the board. For this purpose, the exit opening of the delivery hoses is modified from being round to cone-shaped or beam-shaped. A slurry distributor is known for example from WO 2012/092582 A1, which comprises two material supply lines, which emerge into a common outlet chamber and deliver the foamed material via a flat, rectangular opening onto a running belt. Since the outlet chamber has a larger cross-section than in the supply lines from the mixer to this outlet chamber, the speed of the slurry diminishes markedly in this region. The slurry can thus be deposited onto the belt or the casing material at a low relative speed, preferably the same speed as that at which the belt or the casing material is moving. The slurry can thus be deposited at a slow flow rate.

A further individual measure for improving the situation is a slurry distributing device of U.S. Pat. No. 10,946,549 B2 to Karakoussus et al. comprising: a roller conveyer, wherein three or more rollers are disposed in parallel with one another in a common plane such that gussets between the individual rollers are formed for enabling occurrence of backflow of slurry, the three or more rollers are rotatably mounted about their longitudinal axes and are disposed essentially perpendicular to a delivery direction of the slurry, wherein the slurry distributing device is equipped to be supplied with the slurry from at least one mixing device, to adapt a speed of the slurry to a conveying device speed and to distribute the slurry uniformly over a desired width and then to deliver the distributed slurry onto a lower layer, wherein the slurry distributing device actively transports the slurry. The Karakoussus et al. invention also relates to a conveyor line for the continuous production of drywall boards as well as a slurry distributing device which is used in this conveyor line. The distributing device is used for the uniform and low-speed flow distribution of slurries.

However, improved slurry distribution devices are desired.

SUMMARY OF THE INVENTION

The problem underlying the invention, therefore, is to make available a slurry distributing device for distributing slurry from a mixing device, said slurry distributing device on the one hand ensuring a slurry deposition of uniform strength normal to the delivery direction and on the other hand reducing as far as possible the flushing away of layers already present, in particular slurry layers. A further problem of the invention consists in making a slurry distributing device available that needs to undergo less maintenance than the devices known from the prior art and which is easy to clean. The slurry distributing device will also be referred to simply as "distributing device" in the following.

This problem is solved by a slurry distributing device with the features of the present invention and by a conveyor line employing this slurry distributing device.

The invention provides a roller conveyor comprising parallel rotatable rollers mounted closely together in series and powered by variable speed drives to control the spread of thick slurries, particularly gypsum slurries for use in gypsum board manufacture.

The invention provides a slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two, typically two to five, preferably three or four, roller sections, wherein each roller section has three or more, preferably 6 to 20, more preferably 6 to 10, typically 7 or 8, adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises:

a first plurality of pulleys aligned along a first axis and a second plurality of pulleys aligned along a second axis, said first axis is parallel to the said second axis and parallel to a machine direction of the slurry distributing device which is perpendicular to the rollers of the roller section, the first plurality of pulleys and the second plurality of pulleys adapted and configured to rotate while the rollers rotate, a direct drive roller connected by direct drive to its respective variable speed drive for driving the direct drive roller, and a first belt roller connected to its respective direct drive roller by a first belt drive for driving the first belt roller, wherein said first plurality of pulleys comprises a direct drive roller pulley concentrically connected to the direct drive roller and a first belt roller pulley concentrically connected to the first belt roller, wherein the first belt drive comprises:

the direct drive roller pulley, the first belt roller pulley, and a first belt contacting the direct drive roller pulley and the first belt roller pulley; and the slurry distributing device is adapted and configured to then deliver the distributed slurry onto a lower layer, wherein the slurry distributing device actively transports the slurry.

The invention also provides a slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two, typically two to five, preferably three or four, roller sections, wherein each roller section has three or more, preferably 6 to 10, typically 7 or 8, adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises a direct drive roller connected by direct drive to its respective variable speed drive for driving the direct drive roller, and a first belt roller connected to its respective direct drive roller by a first belt drive, and a second belt roller connected to its respective first belt roller by second belt drive; and the slurry distributing device is adapted and configured to then deliver the distributed slurry onto a lower layer, wherein the slurry distributing device actively transports the slurry.

The roller conveyor of the slurry distributing device of the invention may be built to span the full width of the paper (cross-machine) and can be expanded to account for slower or faster line speeds.

The roller conveyor of the slurry distributing device of the invention may include a set of 3 to 10 rollers to be driven by on variable frequency drive (also known as a variable speed drive). These sections are modular. Thus, these sections of 3 to 10 rollers can be coupled together to create a longer series of rollers in order to spread the slurry The invention may also use the slurry distributing device comprising the roller conveyor comprising parallel rotatable rollers in an apparatus and a method for gypsum board manufacture.

Thus, the invention may also provide a conveyor line for producing gypsum boards, comprising:

a conveying device, at least one mixing device for mixing at least one slurry, and at least one slurry distributing device of the invention comprising a roller conveyer, wherein three or more rollers are disposed in parallel with one another in a common plane such that gussets between the individual rollers are formed for enabling occurrence of backflow of slurry, the three or more rollers are rotatably mounted about their longitudinal axes and are disposed essentially perpendicular to a delivery direction of the slurry;

wherein the at least one slurry distributing device is disposed between a supply device for the slurry and delivery of the slurry, and wherein the at least one slurry distributing device is equipped to adapt a speed of the slurry to a conveying device speed and to deliver the slurry supplied from the at least one mixing device essentially uniformly onto a lower layer, wherein the lower layer is the conveying device itself or a casing material lying on the conveying device, and preferably fed continuously, wherein the at least one slurry distributing device is equipped to actively transport the slurry In method aspects, the invention provides a method for the use of the slurry distributing device according to the present invention, comprising the roller conveyer, including producing gypsum plasterboards in a continuous process.

Advantageously this design can control the slurry spread by using different speeds within the system and does not use any vibration to induce spread. Another advantage is that this system leads to reduction of water usage in board production, and reduces the washout of the densified layer. Another advantage is that this system may lead to mixer boot elimination due to ability to control slurry spread. Another advantage and difference with this design over prior art is that it can employ only one leg boot, eliminating the need for 2 and 3 legged boots.

BRIEF DESCRIPTION OF THE DRAWINGS

FIG. 7A shows a mounting roller bearing.

FIG. 7B shows a horizontal roller support.

FIG. 8A shows a drive roller.

FIG. 8B shows a belt roller.

FIG. 8C shows a last (also known as final or discharge) roller.

FIG. 9 shows support frame for the roller conveyor.

FIG. 10A shows a schematic side view of a roller section of the roller conveyor connected by belts in a Daisy chain.

FIG. 10B shows a schematic side view of a roller section of the roller conveyor connected by belts in a Daisy chain and an independent last (also known as final or discharge) roller.

DETAILED DESCRIPTION OF THE PREFERRED EMBODIMENTS

Figure 1:
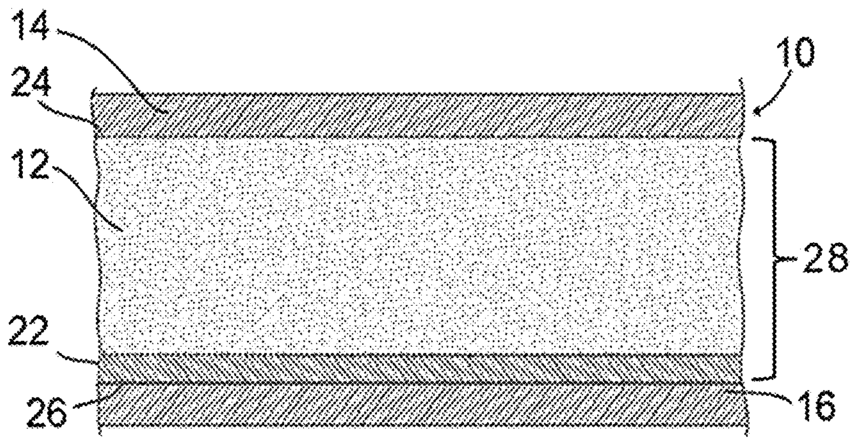
FIG. 1 is a diagram of a side cross-section view of an embodiment of the gypsum panel of the present invention.

The present invention provides a roller conveyor comprising roller sections to control the spread of the gypsum slurry. Each roller section comprising a respective plurality of rotatably mounted parallel rollers and a variable speed drive for driving the rollers of the roller sections all in the same direction. In each roller section the respective variable speed drive drives one roller by direct drive and the other rollers by belt drive.

With a direct drive the rotating actuator of the motor (variable speed drive) is directly attached to the direct drive roller to cause the direct drive roller to revolve (spin) about its longitudinal axis.

With a belt drive typically there is an endless belt and at least two pulleys wherein the endless belt contacts and moves around both pulleys as they revolve (spin). The revolving of one pulley about its respective longitudinal axis moves the belt to drive the other pulley to revolve about its respective longitudinal axis. In the invention typically each pulley is attached to a respective roller. Thus, the revolving of each pulley revolves its respective roller about its longitudinal axis. Typically each roller section has a motor that drives one pully of the roller section to drive one belt of the roller section.

If the roller section has a Daisey chain system having a plurality of belts arranged in series, then each belt moves around two pulleys, one pulley for each respective roller. Each pulley turns to move a belt to turn the next pulley. However, each roller section having this system of the plurality of belts also has a motor with a rotating actuator that by direct drive turns (spins) a pulley attached to a drive roller. The pulley attached to the drive roller drives a belt to spin the adjacent pulley attached to the adjacent roller by belt drive. The adjacent pulley has another belt that moves around it and the next adjacent pulley in the series to turn the next adjacent pulley and its respective roller by belt drive. This arrangement repeats for each additional belt and adjacent pulley in the series.

If the roller section has one belt then the motor directly drives one pulley with direct drive to spin the drive roller and to move the belt that moves around the other pulleys to spin the other pulleys in belt drive.

The variable speed drives, typically AC motor drives, power the parallel rollers of the respective roller sections to spin in the same direction and spread and level the gypsum slurry that is deposited on the parallel rollers and then passes over the parallel rollers along a main flow axis in a machine direction transverse to the rollers. The gypsum slurry then drops off a downstream discharge end of the roller conveyor to deposit on a gypsum board assembly line as a second layer of slurry on a moving surface of a previously deposited first layer of gypsum slurry spaced a distance "L" below the discharge end of the roller conveyor.

The invention manipulates roller speed to control spread of the aqueous gypsum slurry.

An average velocity of the slurry discharged from the roller conveyor is less than 50% of an average velocity of the main flow of aqueous cementitious slurry discharged onto the roller conveyor.

Accordingly, a slurry distributing device according to the invention is equipped to be supplied with a slurry from at least one mixing device, to adapt the speed of the slurry to a conveyor belt speed, to distribute it uniformly over a desired width and to deliver the distributed slurry onto a lower layer. The slurry distributing device transports the slurry actively. Hose outlets of any kind are not involved in the active transport of the slurry, but merely provide a line for the slurry which can modify the speed of the slurry. They do not however have any active influence on this speed.

The slurry distributing device is equipped to be supplied with a slurry from at least one mixing device. The slurry supply can take place for example with a hose or boot, preferably a hose, which create a connection between the mixing device and the distributing device. The slurry can for example be delivered from above onto the distributing device. In the case of a hose supply, therefore, the slurry can for example run out of the hose or hoses onto the distributing device. The hoses diameter is adapted in the optimum manner for a self-cleaning effect. Since the discharge of the slurry first takes place onto the distributing device, the discharge rate is not a critical magnitude. There is therefore greater freedom in selecting the diameter of the hoses than in the case of the known systems. A benefit of the present roller conveyor invention is that it achieves suitable slurry distribution from only a single hose.

Within the scope of this invention, the distributing device for the slurry denotes a device which transports the slurry actively in the delivery direction. It may for example involve a roller conveyor or a belt device or a combination of the two. The active transport of the slurry through the distributing device is to be distinguished from an outflow of the slurry from a supply line or an associated exit opening directly onto the lower layer or the last deposited layer of the gypsum strip to be produced. The distributing device is an additional device, which is disposed between the slurry supply line from the mixer and the application onto the gypsum strip to be produced.

Once the slurry flowing out in a turbulent manner has settled down, been adapted to a conveying device speed and distributed uniformly over a desired width, the slurry is delivered onto the lower layer. The lower layer can for example be a conveying device such as a conveyor belt. The lower layer can however also be a casing material such as the gypsum plasterboard cardboard (cardboard web) or a nonwoven fabric or suchlike. Moreover, the lower layer can be a casing material onto which one or more layers of gypsum have already been applied. For the sake of simplification, the delivery of the slurry onto the lower layer will be referred to in the following.

In a preferred embodiment of the invention, the slurry distributing device comprises at least two, preferably a plurality of rollers disposed in parallel with one another, which are located in a common plane and are rotatably mounted about their longitudinal axes. The parallel axes of the rollers are disposed essentially perpendicular to the delivery direction of the slurry. An essentially perpendicular arrangement is understood to mean an arrangement which enables conveying of the slurry by rotating the rollers onto the lower layer. A preferred embodiment of the invention thus makes provision such that the rollers rotate in the delivery direction. It may however also be advantageous for at least individual rollers to rotate in the opposite direction.

Particularly preferably, the rollers are in close physical contact with one another, so that the lateral surfaces of the cylindrical roller bodies slide past one another during rotation. The spacing between the individual rollers is preferably in a range from 0.1 to 0.5 mm.

The closest possible arrangement of the rollers beside one another has two advantageous effects. On the one hand, the virtually gap-free arrangement prevents slurry from running out or dripping through downwards. On the other hand, the close arrangement brings about self-cleaning of the rollers, as a result of which adhesion and depositing of the slurry on the rollers is effectively prevented or at least greatly reduced.

According to an alternative embodiment of the invention, the rollers can also be disposed spaced apart. The maximum spacing between the individual rollers is then determined by the viscosity of the slurry and the conveying rate onto the distributing device. The higher the viscosity of the slurry and/or the greater the conveying speed, the greater the spacing that can be selected, without the slurry dripping through the device.

According to a particularly preferred embodiment of the invention, the rollers have a uniform diameter. The rollers, which are identical in size and shape, can be produced more cost-efficient than individual special rollers.

If the rollers are disposed in direct contact with one another, it is essential for the durability and good tightness of the distributing device against the running-out of slurry that the rollers have, as far as possible, perfect concentric running properties. Perfect concentric running properties also lead to a lower degree of wear on the rollers, since they do not damage one another due to their uneven surfaces. Particularly preferably, the concentricity tolerance of the rollers is less than 0.1 mm.

A preferred embodiment comprises, in addition to the previously described rollers which are used for the conveying, at least one discharge roller (also known as final roller or last roller) in the delivery direction. The discharge roller can have a smaller diameter than the other rollers. Particularly preferably, this roller rotates against the delivery direction.

This discharge roller is preferably disposed beneath the plane of the other rollers. It can for example be pre-tensioned with a spring, so that it is pressed against the penultimate roller of the roller conveyor even when there is wear on the rollers. The pressing of the discharge roller against the penultimate roller of the roller conveyor on the one hand enables the drive for the discharge roller by power transmission through friction against the penultimate roller, so that this roller does not require its own drive. The drive for this discharge roller not lying in a plane with the other rollers of the roller conveyor would otherwise have to take place separately. Moreover, the self-cleaning of the discharge roller is thus also ensured.

Such an arrangement also has the advantage that the slurry runs onto the lower layer as it would over a step and the free fall height is thus reduced. The slurry thus strikes the lower layer with a markedly reduced impact, so that flushing effects can be completely avoided or at least greatly minimized. The average diameter of this discharge roller preferably lies between 5 and 50 mm.

Particularly preferably, the discharge roller has a smaller diameter than the other rollers. A smaller drop height of the slurry from the surface of the rollers onto the surface of the lower layer can thus be achieved, because the roller axis can be disposed at a small distance from the surface of the lower layer.

Instead of just one single discharge roller, a plurality of discharge rollers can also be provided, which continuously reduce the discharge height of the slurry by the fact that they form for example an inclined plane.

The roller conveyor is at least approximately as wide as the gypsum plasterboard that is to be produced on the conveyor line. The roller conveyor is advantageously wider than the gypsum plasterboard to be produced. A roller conveyor for gypsum plasterboards with a width of 1200 to 1250 mm can thus advantageously be 1200 to 1500 mm wide. The speed of the rollers can be adjusted to produce narrower or wider boards.

The length of the roller conveyor in the conveying direction is dependent, amongst other things, on the belt speed of the production plant. In the case of belt speeds of up to 200 m/min., the length of a typical roller conveyor preferably amounts to at least 900 mm. For production plants which have higher belt speeds, the roller conveyor usually has to be dimensioned longer. The length of the roller conveyor typically lies between 750 mm and 1500 mm. In principle, the distributing device should have a length that makes it possible for the slurry flowing out in a turbulent manner to settle and to be distributed over the desired width.

The rollers can be driven and controlled by at least one controllable drive. For example, the rotational speed and therefore the quantity of slurry delivered onto the lower layer per unit of time can thus be controlled. The use of more than one controllable drive has the advantage that different roller groups can be controlled independently of one another. Thus, for example, every other roller can be rotated against the drive direction or the roller group at the end of the roller conveyor can rotate more rapidly than the roller group at the beginning of the roller conveyor.

Cylindrical backflows arise in the gussets between the rollers, said backflows leading to a transverse distribution of the slurry on the distributing device. This has the advantage that the relatively narrow outlet region of the slurry supply, for example by means of the hose, is widened by the backflow and the associated transverse distribution. At the same time, there is also a reduction in the speed at which the slurry moves in the delivery direction. The more rollers are arranged one behind the other, the more pronounced the two effects are.

These effects are used within the scope of the present invention. The reduced speed and the uniform distribution of the slurry over the width of the slurry distributing device enables a uniform slurry supply over the entire width of the lower layer without special technical refinements, said slurry supply being robust and producing excellent results in terms of flushing effects scarcely occurring or not occurring at all. A complicated outlet funnel technology, as described in the prior art, is not necessary. The distributing device can be operated open, so that it is easily accessible for maintenance work. The self-cleaning effect minimizes the frequency and duration of maintenance work.

The slurry distributing device preferably comprises at least one section comprising at least three rollers in a common plane. Typically sufficient sections to provide 10 to 50 rollers are employed for achieving a uniform transverse distribution of the slurry on the distributing device. Depending on the viscosity of the slurry and the speed of the gypsum strip on the conveying device, it may be advantageous to use a greater or lesser number of rollers.

Rollers typically have a diameter of 10 to 100 mm. Roller diameters in the range between 30 and 80 mm are preferred.

Slurry distributing devices according to the invention, as described above, can be used advantageously for the production of gypsum plasterboards in a continuous process.

The invention also relates to a conveyor line for producing gypsum plasterboards, which comprises a conveying device, at least one mixing device for mixing at least one slurry and at least one slurry distributing device. The slurry distributing device is disposed between a supply device for the slurry and the delivery of the slurry. The slurry distributing device is equipped to deliver the slurry supplied from the mixing device essentially uniformly onto a lower layer, wherein the lower layer is the conveying device itself or a casing material lying on the conveying device and preferably fed continuously. Moreover, the slurry distributing device is equipped to actively transport the slurry.

In order to keep the impact of the slurry when it strikes the lower layer as small as possible and thus to minimize the flushing-away effect, the discharge height of the slurry is typically less than 20 cm. The discharge height is understood to mean the height difference between the uppermost point of the discharge roller and the surface of the lower layer. In this case, the lower layer can also comprise an already deposited layer, in particular a gypsum layer. In this case, the discharge height denotes the difference between the uppermost point of the discharge roller and the surface of the layer last deposited. In principle, the discharge height should be selected as small as possible.

According to a particularly preferred embodiment of the invention, the conveyor line for producing gypsum plasterboards comprises a plurality of slurry distributing devices, which are disposed one after the other in the conveyor line. The distributing devices can deliver identically or differently constituted slurries onto the lower layer, so that a multilayer structure of the gypsum plasterboard is possible. The advantage of the reduced or non-existent flushing effect is particularly beneficial precisely with this embodiment of the invention. The layers can be deposited upon one another without problem, without extensive setting of the layers lying beneath being absolutely necessary. With the inventive device, the slurry can be fed approximately at the same speed as that at which the belt is moving. The relative speed of the slurry in the delivery direction is thus approximately equal to zero (within the scope of what is technically possible).

The distributing devices can be of the same kind or different. For example, the first distributing device can comprise just a roller conveyor, whilst the other distributing devices are combinations of a process belt and a roller conveyor. Other combinations are of course also possible.

The described slurry distributing devices for producing gypsum plasterboards are advantageously used in the continuous process.

The invention is explained below in greater detail with the aid of drawings. Identical or similar features are provided with the same reference numbers, except where otherwise indicated.

Figure 2:
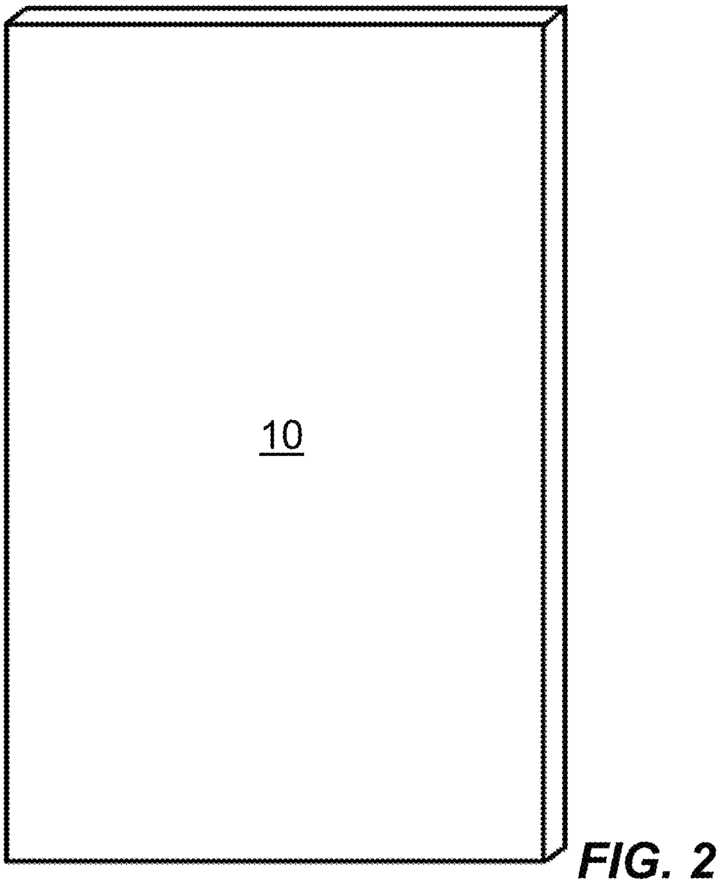
FIG. 2 is a diagram of a perspective view of an embodiment of the gypsum panel of the present invention.

The invention provides a gypsum board as shown by FIGS. 1 and 2.

FIG. 1 is a diagram of a side cross-section view of an embodiment of the gypsum panel 10 of the present invention. The gypsum panel has a core 28 including a relatively denser layer 22, typically of unfoamed gypsum, and a relatively less dense layer 12, typically of foamed gypsum. An outer surface 24 of the less dense layer 12 contacts a backer sheet 14. An outer surface 26 of the denser layer 22 contacts a facer sheet 16. Typically backer sheet 14 and facer sheet 16 are made of paper or non-woven glass mat.

FIG. 2 shows a perspective view of the wallboard panel 10. The board has a core 28 that comprises a set lower-density region (also known as a less dense region or less dense layer) 12 as a layer comprising calcium sulfate dihydrate and a set higher-density region (also known as a densified region, densified layer, or a thin dense gypsum layer) 22 as a layer comprising calcium sulfate dihydrate.

Figure 3:
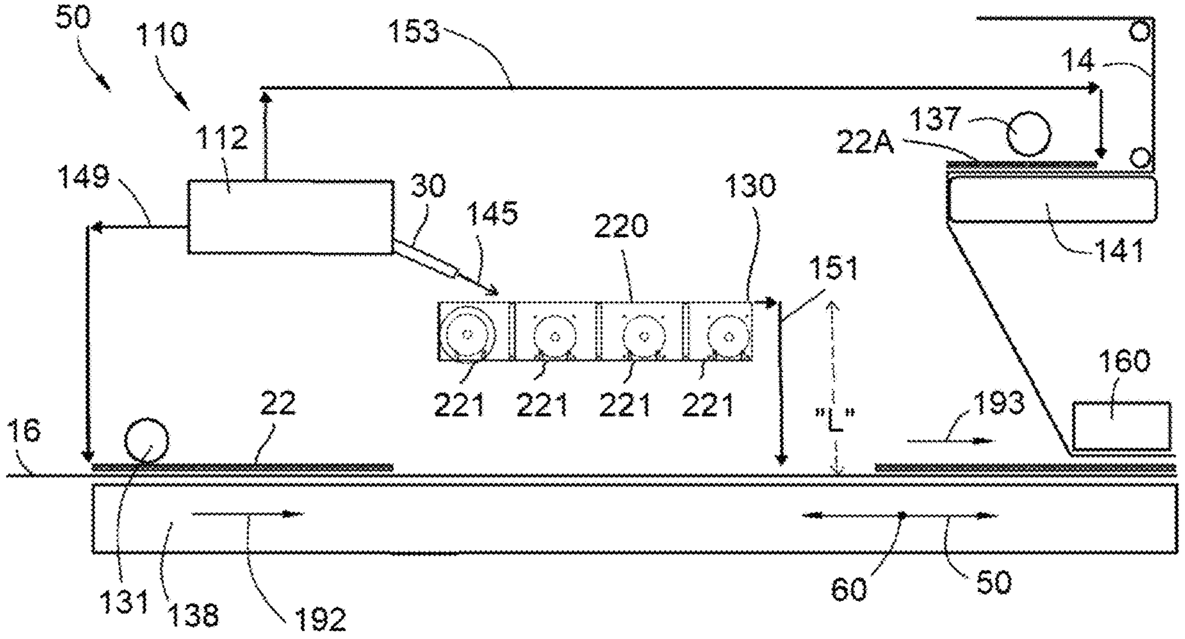
FIG. 3 shows a gypsum board assembly line to perform a process of making a gypsum board with the present roller conveyor.

FIG. 3 shows diagrammatically a detail from a wet end 50 of a gypsum wallboard manufacturing line according to the invention. Front-side facer 16, onto which the gypsum slurry is deposited, is delivered onto a conveyor belt (not shown) via a deflection roller (not shown). Front-side facer 16 is first coated with a boundary layer slurry 149. For this purpose, the slurry 149 is delivered from a mixer 112 onto the front-side facer 16 and distributed by means of a roller 131 over the width of the facer sheet 16 and smoothed out to the desired height.

In parallel with this, backer sheet 14 is coated with the aid of roller 137 with the same or a similar slurry 153 from boundary layer mixer 112.

Slurry 145 for the relatively less dense layer 12 of the core layer 28 of the gypsum plasterboard 10 is may also be produced in the mixer 112 and delivered via delivery hose 30 onto the slurry distributing device that is a roller conveyor 220. Roller conveyor 220 comprises a plurality of rollers 224, 222, 225 and a discharge roller 226 at the end of roller conveyor 220 with a smaller diameter as described elsewhere in the present specification. The rollers 224, 222, 225 of roller conveyor 220 are disposed in a common plane. The drive roller 224 and other rollers 222, 224, 225 of a section are of equal diameter. The discharge roller 226 has its own drive and may have a smaller diameter. The rollers 224, 222, 226 also have equal transverse lengths “L7” along their longitudinal axes “L4”, “L2” and “L5”. The end belt roller 225 also has a transverse length equal to transverse length “L7”. The rollers 224, 222, 225, 226 in this example have an average spacing of 0.1-0.5 mm from one another.

The rollers are grouped by roller sections 221. Each roller section 221 has an independently controlled drive unit, namely, respective AC motors 230 (shown elsewhere in the present specification) and can rotate the rollers in different directions. Each roller section has a drive roller 224 connected by direct drive to the respective AC motor 230, belt rollers 222, 224 connected via belts arranged in a Daisy chain to transmit the drive force from the AC motor to belt rollers 222, 224. The belt rollers 222 are between the drive roller 224 and the section end belt roller 225 (see FIG. 4).

The roller conveyor 220 in the present case has a width “W” of 1200-1500 mm and is thus suitable for the production of gypsum plasterboards with a maximum width of 1250 mm. Narrower gypsum plasterboards can be produced by displacing edge plates (not shown), which limit the propagation width of gypsum slurry 145 on roller conveyor 220.

Slurry 145 deposited onto roller conveyor 220 is first retarded by the active transport on rollers 224, 222, 225 and is then distributed in the width. Moreover, the conveying speed of slurry 145 is adapted to the conveying speed of the facer mat 16, i.e., of the conveying belt plant, so that slurry 145 has essentially the same speed as the lower layer in the conveying direction (arrow) when it is delivered as slurry stream 151 onto the lower layer—here the facer mat 16, coated with densified layer 22.

At the end of roller conveyor 220, slurry 151 is delivered step-wise onto facer mat 16 via discharge roller 226 disposed lower down as shown elsewhere in this specification. The uppermost point of discharge roller 226 (also described in this specification as discharge height) is disposed approximately 2 cm to 20 cm, typically 2 cm to 10 cm, more typically 3 cm to 5 cm, above the surface of the lower layer, here densified layer 22 on facer mat 16, so that the drop height “L” of slurry 151 from roller conveyor 220 onto lower layer 22 is small. Its impact upon striking the surface of densified layer 22 is therefore also small and does not trigger a flushing effect in the, in this case, densified layer 22.

After the less dense layer 12 of slurry 151 has been deposited or delivered onto the densified layer 22 of facer mat (facer sheet) 16, the backer mat (facer sheet) 14, optionally with densified layer 22A, is applied onto the layer of slurry 151 for the less dense region 12 of the core layer 28. The gypsum plasterboard strip is then formed, allowed to dry and set, and is divided up and trimmed into the desired board size (not shown). Drying of the boards 10 removes the excess water from the gypsum plasterboards.

In particular, the wet end 50 includes a gypsum slurry mixing and dispensing assembly 110 having a gypsum slurry mixer 112 in fluid communication with a hose or boot 30 that feed a slurry distributor 220, a hard edge/face densified layer roller 131 disposed upstream of the slurry distributor 220 and supported over a forming table 138 such that a first moving web 16 of facer cover sheet material is disposed therebetween. A second moving web 14 of backer cover sheet passes material is optionally provided with a back densified layer. If the back d is provided then an back densified layer roller 137 is disposed over a support element 141 such that the second moving web 14 of cover sheet material is disposed therebetween, and a forming station 160 adapted to shape the preform into a desired thickness. The densified layer rollers 131, 137, the forming table 138, the support element 141, and the forming station 160 can all comprise conventional equipment suitable for their intended purposes as is known in the art. The wet end 50 can be equipped with other conventional equipment as is known in the art.

The gypsum slurry mixer 112 is adapted to agitate water and calcined gypsum to form an aqueous calcined gypsum slurry. The hose or boot 30 is disposed between the gypsum slurry mixer 112 and the slurry distributor 220. The slurry distributor 220 is the roller conveyor of the present invention and described in detail elsewhere in this specification.

Those aspects of a method of preparing a gypsum board product not specifically described herein can be supplied by the techniques known and used in the manufacture of conventional cementitious products.

Water and calcined gypsum can be mixed in the mixer 112 to form an aqueous calcined gypsum slurry. In some embodiments, the water and calcined gypsum can be continuously added to the mixer in a water-to-calcined gypsum weight ratio from about 0.5 to about 1.3, and in other embodiments of about 0.75 or less.

Gypsum board products are typically formed "face down" such that the advancing web 16 serves as the "face" cover sheet of the finished board. A face densified layer/hard edge stream 149 (a layer of denser aqueous calcined gypsum slurry relative to at least one of the first and second flows of aqueous calcined gypsum slurry) can be applied to the first moving web 16 upstream of the hard edge/face densified layer roller 131, relative to the machine direction 192, to apply a densified layer 22 to the first web 539 and to define hard edges of the board.

A main flow 145 of aqueous calcined gypsum slurry is discharged through the hose or boot 30 from the mixer 112 into the slurry distributor 220.

Typically, the flow of aqueous calcined gypsum along the slurry distributor 220 has an average velocity that is at least about 50% of the average velocity of the main flow 145 of aqueous calcined gypsum slurry.

The flow of aqueous calcined gypsum move along a flow path through the slurry distributor 220 in the manner of a streamline flow, undergoing minimal or substantially no air-liquid slurry phase separation and substantially without undergoing a vortex flow path.

The first moving web 16 moves along the longitudinal axis 50. The slurry distributor 220 is positioned such that it extends along the longitudinal axis 50 which substantially coincides with the machine direction 192 along which the first web 539 of cover sheet material moves. Preferably, the central midpoint of the slurry distributor 220 (taken along the transverse axis/cross-machine direction 60) substantially coincides with the central midpoint of the first moving cover sheet 16. The flow 145 of aqueous calcined gypsum slurry from the hose or boot 30 distribute across the slurry distributor 220 such that the discharge flow 151 of aqueous calcined gypsum slurry dropping from a downstream end of slurry distributor 220 then moves in a distribution direction 193 (also termed herein as a delivery direction) generally along the machine direction 192.

The rollers 224, 222, 225, 226 of the slurry distributor 220 are positioned such that they are substantially parallel to the plane defined by the longitudinal axis 50 and the transverse axis 60 of the first web 16 moving along the forming table 138.

The slurry distributor 220 discharges the flow 151 of aqueous calcined gypsum slurry upon the first moving web 16. The densified layer/hard edge stream 149 can be deposited from the mixer 112 at a point upstream, relative to the direction of movement of the first moving web 539 in the machine direction 192, of where the flow 151 of aqueous calcined gypsum slurry is discharged from the slurry distributor 220 upon the first moving web 16. The flow 151 of aqueous calcined gypsum slurry can be discharged from the slurry distributor 220 with a reduced momentum per unit width along the cross-machine direction relative to a conventional boot design to help prevent "washout" of the densified layer/hard edge stream 149 deposited on the first moving web 16 (i.e., the situation where a portion of the deposited densified layer is displaced from its position upon the moving web 16 in response to the impact of the slurry being deposited upon it).

The flow 145 of aqueous calcined gypsum slurry is passed at an average first feed velocity through the slurry distributor 220. The flow 151 of aqueous calcined gypsum slurry is discharged at an average discharge velocity from a distribution outlet (downstream end) 130 of the slurry distributor 220 upon the web 16 of cover sheet material moving along a machine direction 192. The average discharge velocity is less than the average feed velocity of the flow 145 onto the slurry distributor 220.

In some embodiments, the average discharge velocity is less than about 90% of the average first feed velocity and the average second feed velocity. In some embodiments, the average discharge velocity is less than about 80% of the average first feed velocity and the average second feed velocity.

The flow 151 of aqueous calcined gypsum slurry is discharged from the slurry distributor 220 by dropping from the discharge roller 226 of the slurry distributor 220. The opening of the distribution outlet 130 defined by the discharge roller 226 and opposed roller bearings 202, 202A that support the discharge roller 226 has a width extending along the transverse axis 60 and sized such that the ratio of the width of the first moving web 539 of cover sheet material to the width of the opening of the distribution outlet 130 is within a range including and between about 1:1 and about 6:1. In some embodiments, the ratio of the average velocity of the flow 151 of aqueous calcined gypsum slurry discharging from the slurry distributor 220 to the velocity of the moving web 539 of cover sheet material moving along the machine direction 192 can be about 2:1 or less in some embodiments, and from about 1:1 to about 2:1 in other embodiments. The width is about the length "L7" of the rollers 224, 222, 225, 226.

The flow 151 of aqueous calcined gypsum slurry discharging from the slurry distributor 220 form a spread pattern upon the moving web 16.

If the optional densified layer is to be provided, then a back densified layer stream 153 (a layer of denser aqueous calcined gypsum slurry relative to at least one of the first and second flows 547, 548 of aqueous calcined gypsum slurry) can be applied to the second moving web 14 of backer cover sheet. The densified layer stream 153 can be deposited from the mixer 112 at a point upstream, relative to the direction of movement of the second moving web 14, of the back densified layer roller 137.

In some embodiments, the velocity of the slurry 145 discharging from the hose or boot 30 can oscillate periodically between relatively higher and lower average velocities to help reduce the chance of buildup within the slurry distributor 220.

In embodiments of a method of preparing a gypsum board product, a main flow of aqueous cementitious slurry is discharged from a mixer. The main flow of aqueous gypsum slurry from the mixer is distributed in the slurry distributor. The method of preparing a gypsum board product include discharging the flow of aqueous cementitious slurry from the slurry distributor downwardly in a generally vertical direction upon a web of cover sheet material moving along a machine direction.

All references cited herein are hereby incorporated by reference to the same extent as if each reference were individually and specifically indicated to be incorporated by reference and were set forth in its entirety herein.

Figure 4:
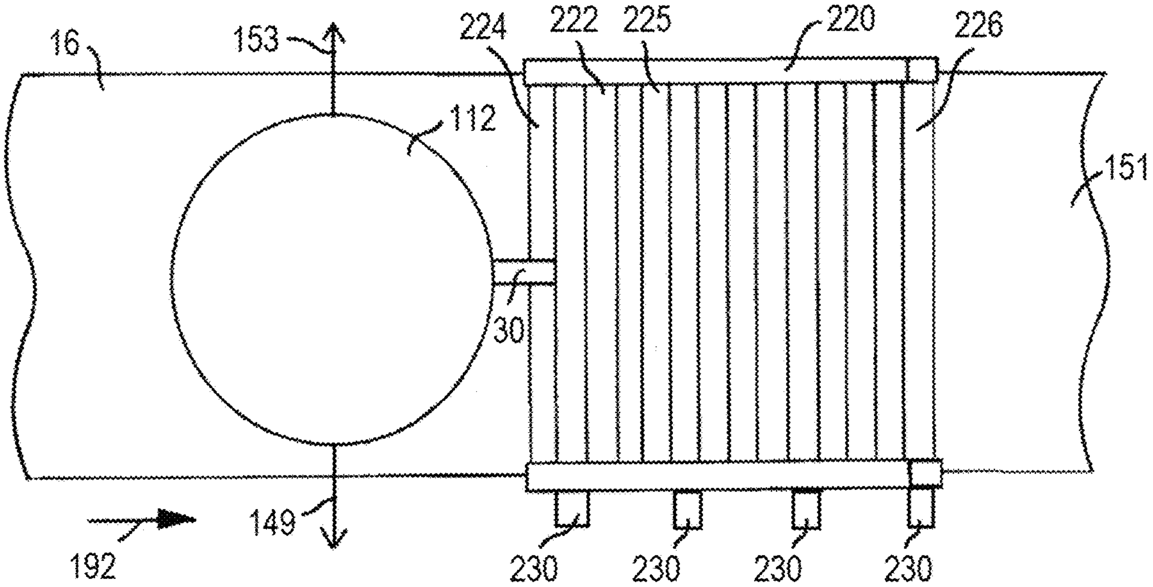
FIG. 4 shows a top view of an embodiment of the present roller conveyor.

FIG. 4 shows the roller conveyor 220 once again in plan view. The roller 222 at the end of a section 221 is labelled as the end roller 225. Thus, in the invention generally the end roller 225 has the same dimensions as the other rollers 222. Unless, of course, if the end roller 225 were the drive roller 224 then it would have the drive roller 224 dimensions.

Figure 5:
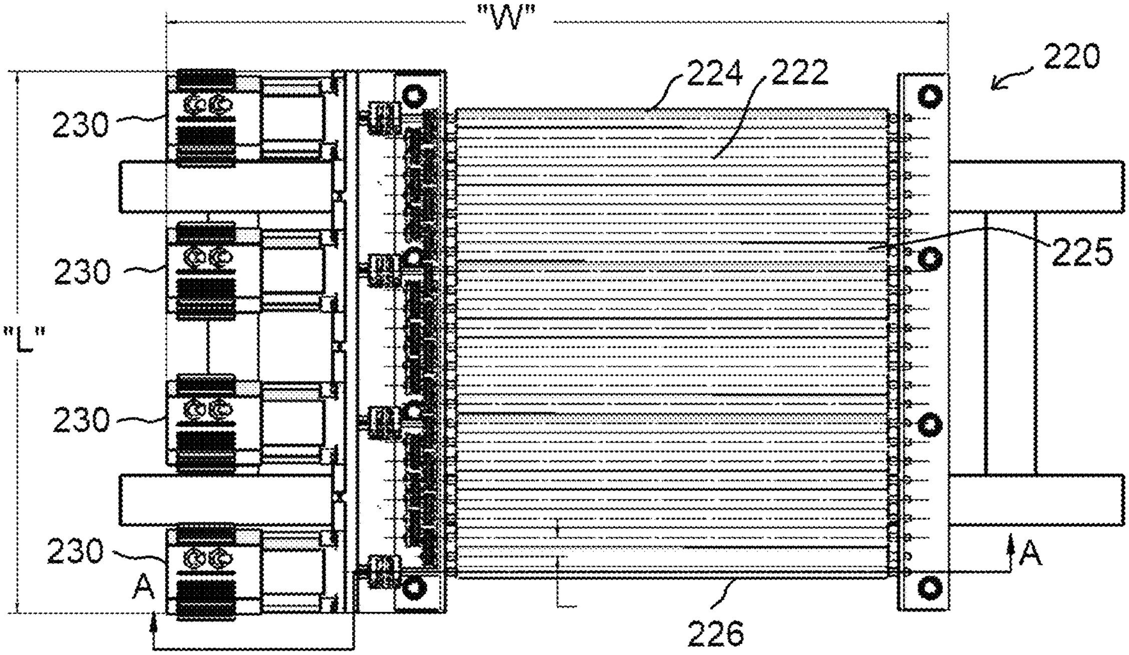
FIG. 5 shows a top view of an embodiment of a roller conveyor having 3 roller sections to be driven all in the same direction by 3 AC (variable speed) motor drives and a last (also known as final or discharge) roller driven by an AC (variable speed) motor.

FIG. 5 shows a top view of an embodiment of the roller conveyor 220 having 3 roller sections 221 to be driven all in the same direction by 3 AC motor drives. The embodiment also has at a downstream discharge end an optional discharge roller 226 powered by its own AC motor drive. Each roller section 221 has a drive roller 224 connected by direct drive to the respective AC motor 230, subsequent belt rollers 222 and an end belt roller 225.

Figure 5A:
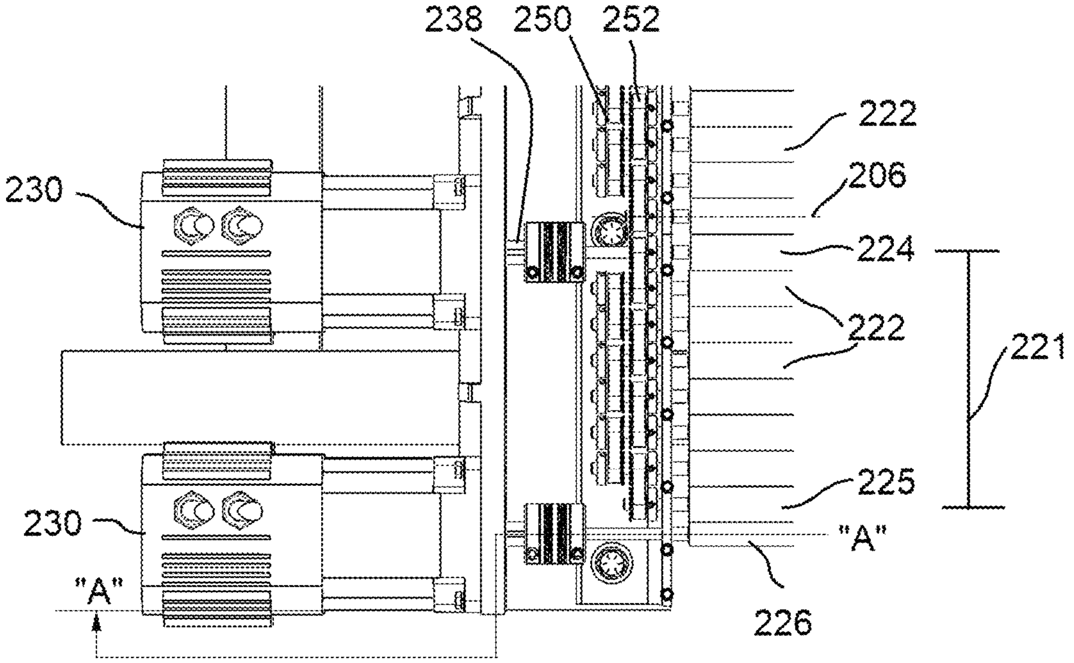
FIG. 5A shows an enlarged view of a portion of the top view of FIG. 5.

FIG. 5A shows an enlarged view of a portion of the top view of FIG. 5. FIG. 5A shows a roller section 221 including the drive roller 224, belts rollers 222 and end belt roller 225 as well as the AC motor 230 to power the drive roller 224. This shows the axle 238 connecting the motor 230 to the drive roller 224. It also shows the belts 250, 252 that transmit drive force from the drive roller 224 to the other rollers 222, 225 by a daisy chain arrangement of these belts 250, 252, described in more detail elsewhere in this specification. Belt rollers 222 having an axis 206.

Figure 5B:
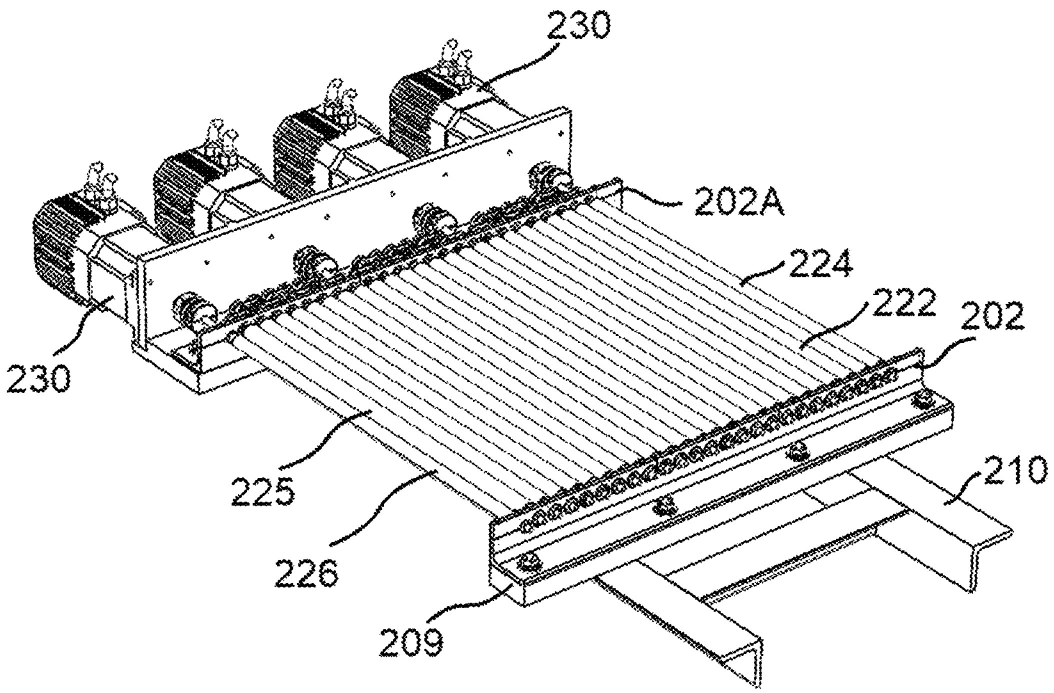
FIG. 5B shows a perspective view of the embodiment of FIG. 5.

FIG. 5B shows a perspective view of the embodiment of FIG. 5. This shows the opposed mounting roller bearings 202 and 202A for supporting the rollers 222, 224, 225, 226. This also shows horizontal support 209 and bottom frame 210 for supporting the roller conveyor sections 221.

Figure 6:
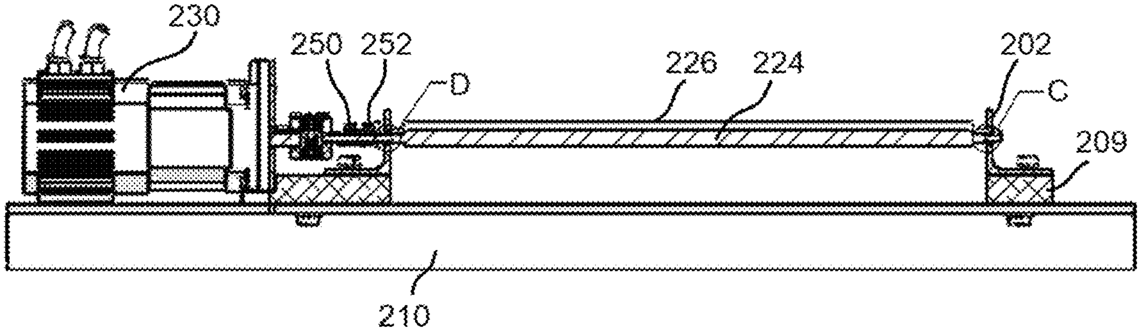
FIG. 6 shows a side view along cross-section A-A of the embodiment of FIG. 5.

FIG. 6 shows a side view along cross-section A-A of the embodiment of FIG. 5. This shows the belts 250, 252.

FIG. 7A shows a mounting roller bearing 202 having holes 198 to support rollers 222, 224, 225 of the roller sections 221 and hole 199 to support the discharge roller 226. The mounting roller bearing 202 has length of the holes “4” and overall length “L5”. The holes 198 have a height “H1”. The hole 199 has a height “H2” which is the same as or less than height “H1”. The mounting roller bearing 202A is a mirror image of mounting roller bearing 202.

FIG. 7B shows a horizontal roller support 209 having holes 196.

FIGS. 8A-B show the drive roller 224 and belt rollers 222 of a section are of equal diameter. In this example rollers 222, 224 have a diameter “D4”, “D2” in a range of approx. 40-80 mm. The end roller 225 of the section has the same diameter as rollers 222, 224 of the section. The discharge roller 226 (also termed in this specification as a last roller or a final roller) has its own drive and may have a smaller diameter. The diameter of the discharge roller 226 lies in a range of approx. 25-50 mm. The rollers 224, 222, 226 also have equal transverse lengths “L7” along their axes “L4”, “L2” and “L5” to extend across the slurry flow path. The end roller 225 of the section also has a transverse length equal to transverse length “L7”.

FIG. 8A shows the drive roller 224 of a roller section 221 has axle extensions 224A and 224B. Axle extension 224A is held within a hole 198 of mounting roller bearing 202A and provides a location for attaching to it a pulley 262 described below and attaching to a motor 230. Axle extension 224B is held within a hole of mounting roller bearing 202.

FIG. 8B shows the belt roller 222 has extensions 222A and 222B. Axle extension 222A is held within a hole 198 of mounting roller bearing 202A. Axle extension 222B is held within a hole of mounting roller bearing 202. The roller 222 at the end of a section 221 is labelled as the end roller 225. Thus, in the invention generally the end roller 225 has the same axle extensions 222A, 222B as the other rollers 222. Unless, of course in an embodiment not shown, if the end roller 225 were the drive roller 224 then the end roller 225 would have the drive roller 224 axle extensions 224A, 224B.

FIG. 8C show the discharge roller 226 has extensions 226A and 226B. Axle extension 226A is held within a hole 199 of mounting roller bearing 202A and for attaching to a motor 230 described below. Axle extension 226B is held within a hole of mounting roller bearing 202.

FIG. 9 shows support frame 210 for the roller conveyor.

FIG. 10A shows a schematic side view of a roller section 221 of the roller conveyor 220 connected by belts 250, 252 in a Daisy chain. A plurality of roller pulleys and belts connected in series form the Daisy chain. The roller section 221 has four rollers 224, 222, 222, 225 and three belts 252, 250, 252 arranged in a Daisy chain. FIG. 10A shows the four rollers spaced to more easily see the rollers in the drawing. To more easily see pulleys 260, 262 FIG. 10A shows the outer pulleys 260 (also termed herein as primary pulleys) having a relatively smaller diameter than the inner pulleys 262 (also termed herein as secondary pulleys). However, in practice typically the inner pulleys and the outer pulleys have the same diameter.

The drive roller 224 has an axle extension 224A connected to a motor 230. A pulley 262 is mounted concentrically on the axle extension 224A. The AC motor 230 connected to the axle extension 224A drives the drive roller 224 with direct drive. Thus, when the AC motor 230 rotates the drive roller 224 the inner pulley 262 also rotates.

FIG. 10A also shows a second roller (belt roller 222), a third (belt roller 222) and a fourth roller (end belt roller 225).

An inner pulley 262 and an outer pulley 260 are mounted concentrically on the respective roller axle extension 222A of each belt roller 222. Thus, when the belt roller 222 rotates the respective inner pulley 262 and outer pulley 260 also rotates. Inner and outer represent proximity to the mounting roller bearing 202A.

An inner pulley 262 is mounted concentrically on the respective roller axle extension 225A of the end belt roller 225. Thus, when the end belt roller 225 rotates the inner pulley 262 also rotates.

Each inner pulley is sequentially connected by a belt to the inner pulley of an adjacent roller. Each outer pulley is sequentially connected by a belt to the outer pulley of an adjacent roller. The two pulleys connected by a respective belt should have the same diameter so that the respective rollers will rotate at the same rotation speed.

Thus, a first inner belt 252 connects the inner pulleys 262 of the drive roller 224 and adjacent first belt roller 222.

An outer belt 250 connects the outer pulleys 260 of the adjacent first and second belt rollers 222.

Another inner belt 252 connects the inner pulley of the second belt roller 222 to the inner pulley of the end belt roller 225.

The end belt roller 225 has one pulley because it does not drive a subsequent pulley. However, for convenience of using uniform parts, it could have inner and outer pulleys.

Thus, in operation, when the AC motor turns the axle of the first roller this moves the first belt to rotate the second roller. When the second roller rotates this moves the second belt to rotate the third roller. When the third roller rotates this moves the third belt to rotate the fourth (end) roller. This series of belts and rollers repeats depending on the number of rollers in the section.

FIG. 10B shows a schematic view of the arrangement including the direct drive and belts for driving the rollers of a roller section as described above, wherein rollers of the roller section of the roller conveyor are connected by belts in a Daisy chain, and including an optional independent discharge roller 226. The discharge roller 226 has a separate AC motor 230 connected to the axle of the discharge roller 226 to independently drive the discharge roller 226 with direct drive.

Figure 11:
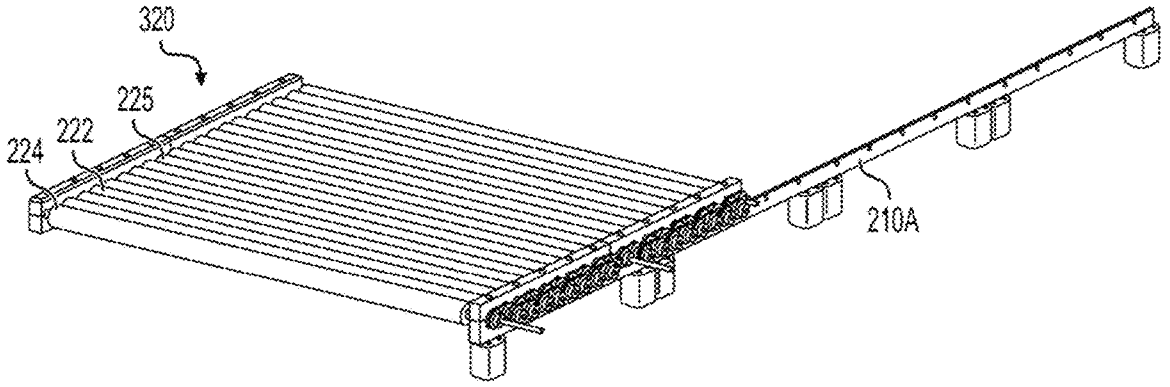
FIG. 11 shows a second embodiment of a modular roller section of the present invention.

FIG. 11 shows a second embodiment of a modular roller section 320 of the present invention having rollers 222, 224, 225 on a support 210A. To simplify the drawing the motors are not shown.

Figure 12:
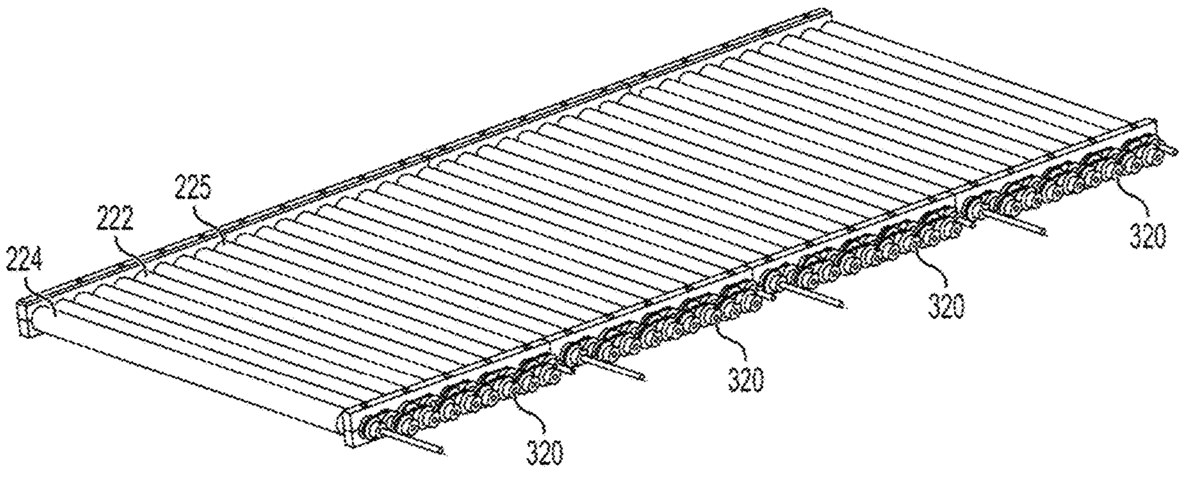
FIG. 12 shows a series of attached modular roller sections of the present invention.

FIG. 12 shows a series of attached modular roller sections 320 of the present invention having rollers 222, 224, 225. The modular roller sections 320 may be individually attached to the support and/or each other by any suitable connection.

Figure 13:
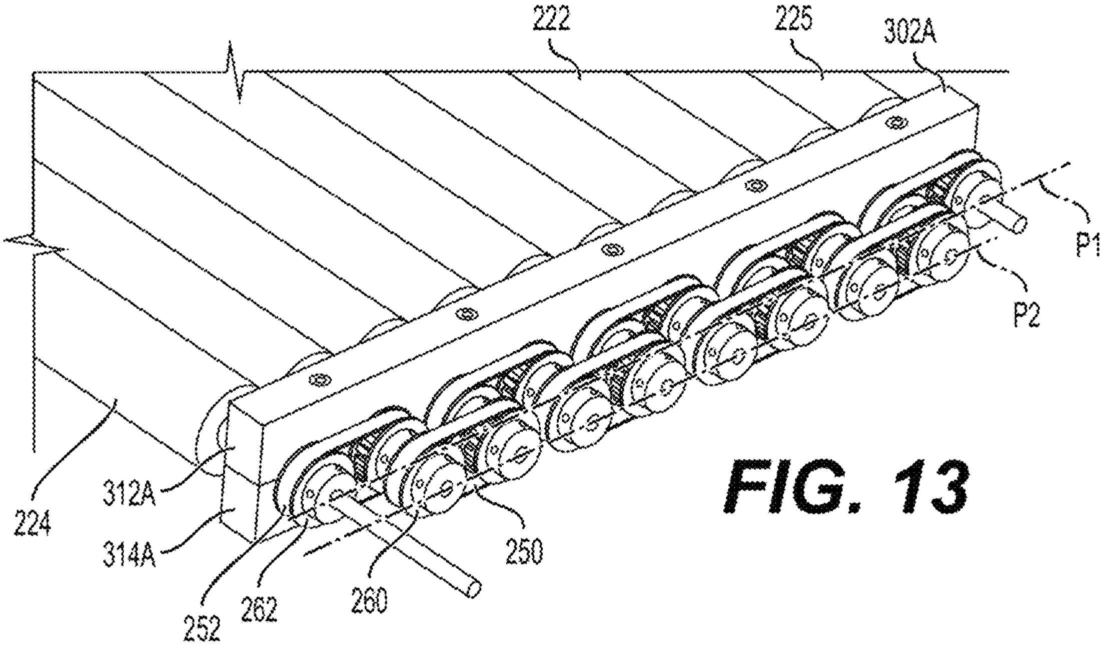
FIG. 13 shows an enlarged perspective view of a portion of the modular roller section of the present invention.

FIG. 13 shows an enlarged perspective view of a portion of the modular roller section 320 of the present invention. This shows the mounting roller bearing 302A having upper part 312A removably attached by screws 330 to lower part 314A. The inner pulleys 262 are aligned along a first pulley axis "P1" parallel to the machine direction 192. The outer pulleys 260 are aligned along a second pulley axis "P2" parallel to the machine direction 192. Thus, the first pulley axis "P1" is parallel to the second pulley axis "P2". The second pulley axis "P2" is parallel to first pulley axis "P1". The second pulley axis "P2" first pulley axis "P1" lie on a common plane with the longitudinal axes "L2", "L4".

Figure 14:
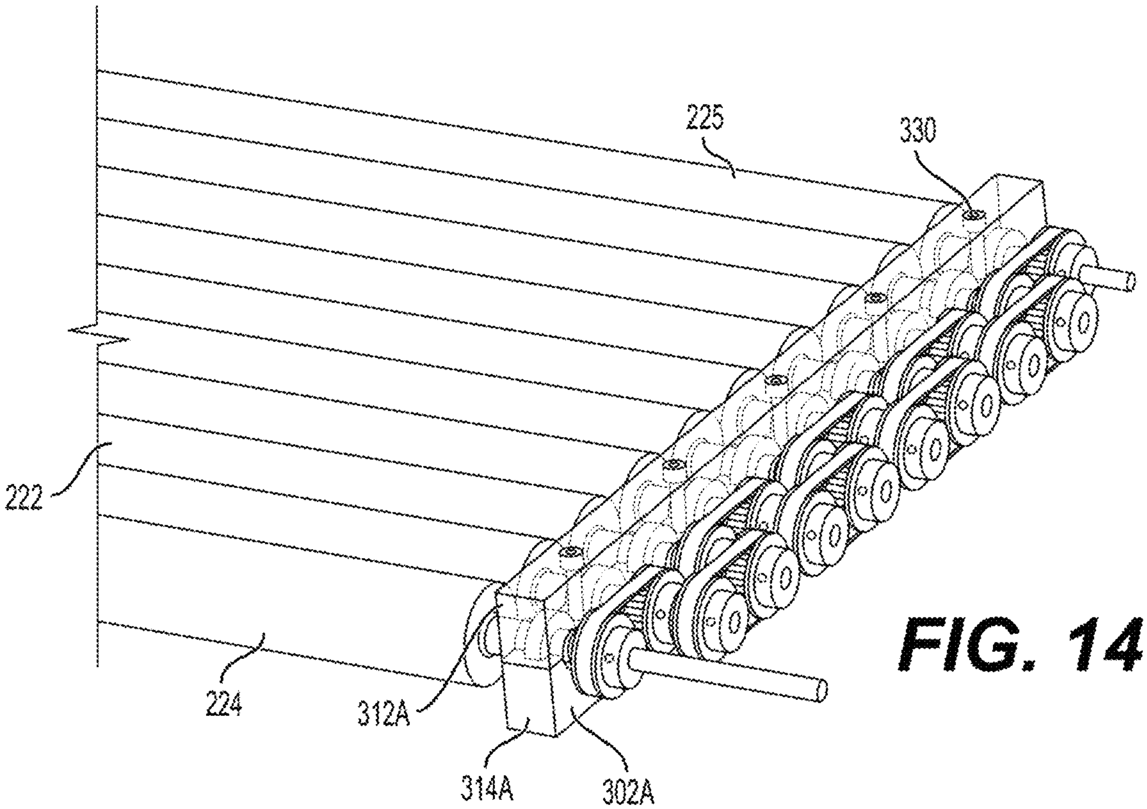
FIG. 14 shows a transparent view showing the mounting roller bearing.

FIG. 14 shows a transparent view showing the mounting roller bearing 302A has a two part construction including the upper part 312A removably attached by screws 330 to the lower part 314A so the upper part 312A can be lifted off the lower part 314A to access the rollers of the roller section for maintenance.

Figure 15:
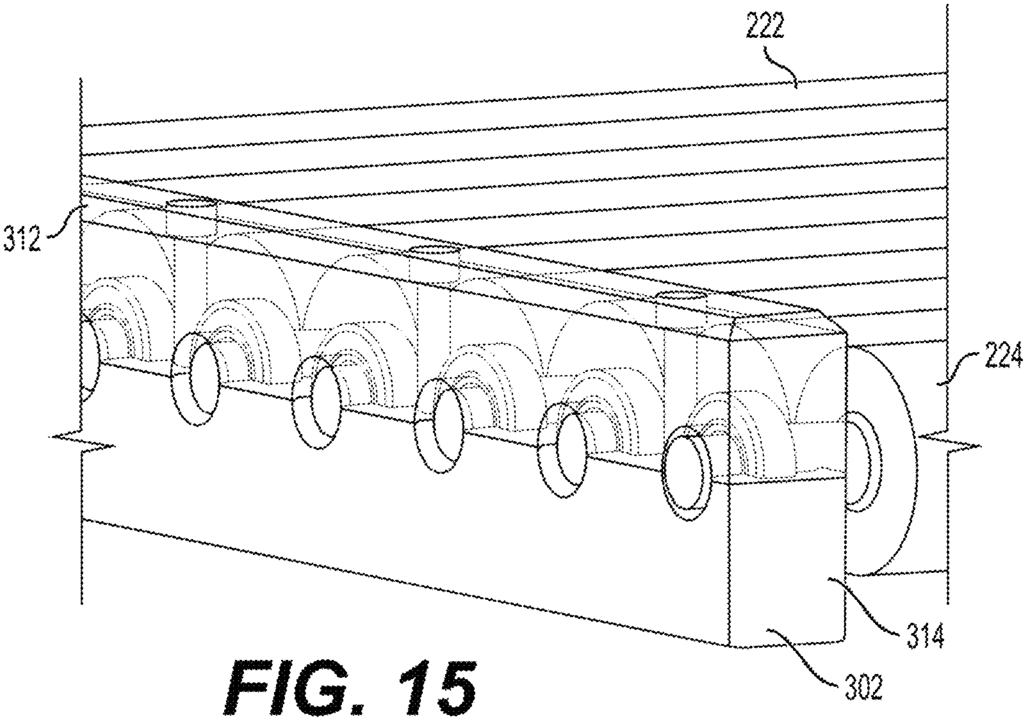
FIG. 15 shows a transparent view showing the mounting roller bearing, which is opposed to the mounting roller bearing of FIG. 14.

FIG. 15 shows a transparent view showing the mounting roller bearing 302, which is opposed to the mounting roller bearing 302A, has a two part construction including the upper part 312 removably attached by screws 330 to the lower part 314 so the upper part 312 can be lifted off the lower part 314 to access the rollers of the roller section for maintenance.

Figure 16:
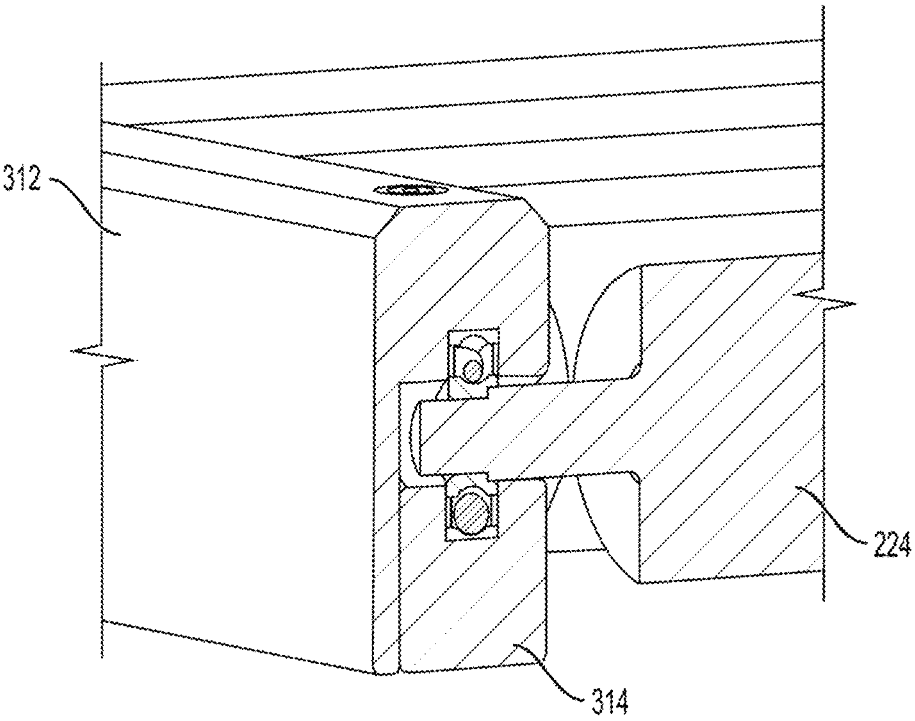
FIG. 16 shows a cross section of a portion of a roller and the mounting roller bearing.

FIG. 16 shows a cross section of a portion of the roller 224 and the mounting roller bearing 302 and how the roller 224 is mounted showing the mounting roller bearing 302 has the two part construction so the upper part 312 can be lifted off the lower part 314 to access the rollers for maintenance.

Figure 17:
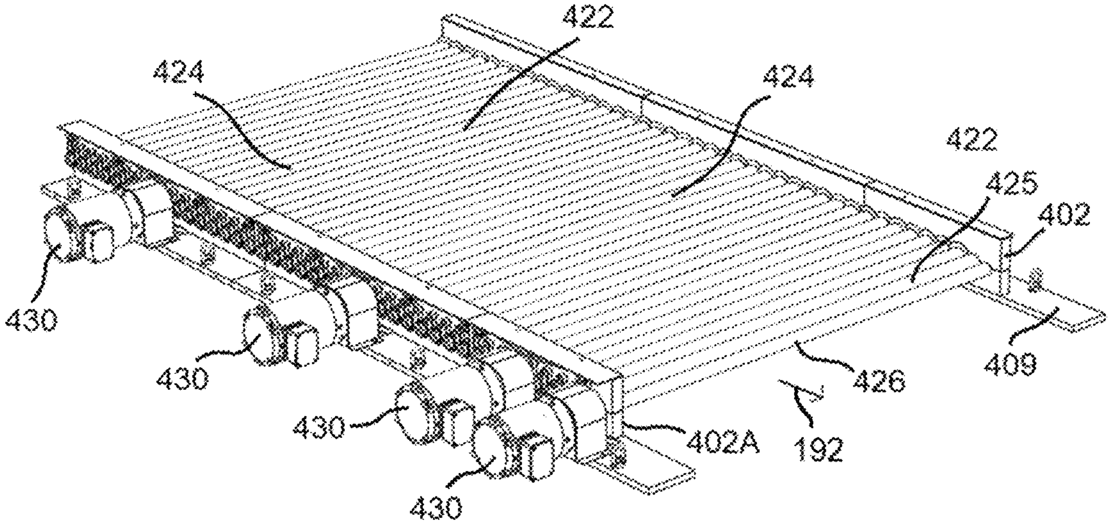
FIG. 17 shows a perspective view of a second embodiment of a roller conveyor having 3 roller sections to be driven all in the same direction by 3 AC (variable speed) motor drives and a discharge roller (also known as a final or last roller) driven by an AC (variable speed) motor.
Figure 21:
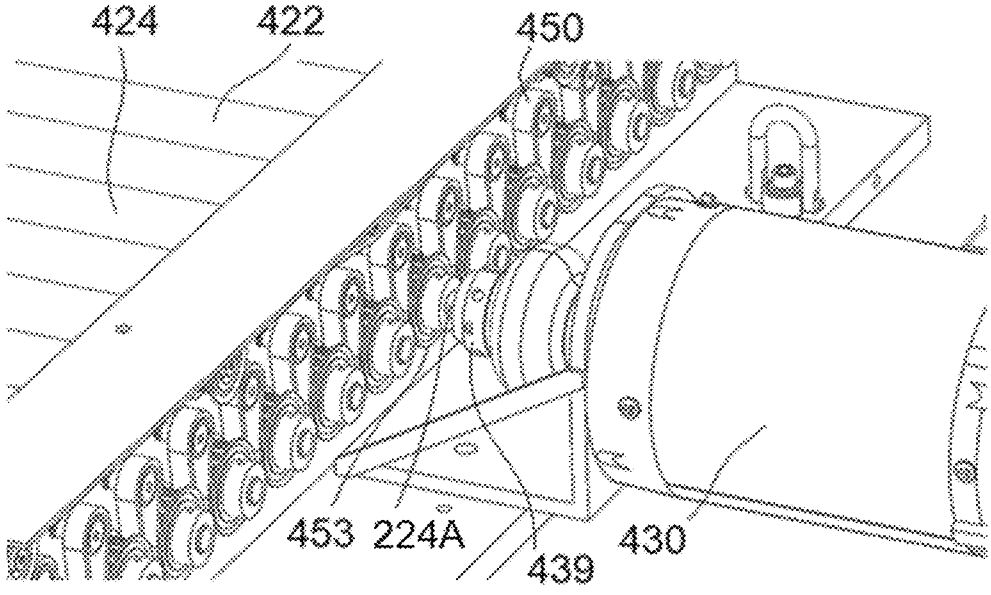
FIG. 21 shows an enlarged perspective view of a middle portion of a modular roller section of the second embodiment of the present invention.

FIG. 17 shows a perspective view of a second embodiment of a roller conveyor having 3 roller sections to be driven all in the same direction by 3 AC (variable speed) motor drives 430 and an end roller 425 driven by an AC (variable speed) motor to convey slurry along a machine direction 192. FIG. 21 shows an embodiment of the roller conveyor 420 having 3 roller sections 421 to be driven all in the same direction by 3 AC motor drives 430. The embodiment also has at a downstream discharge end an optional discharge roller 426 (also termed herein as a last or final roller) powered by its own AC motor drive 430. Each roller section 421 has a drive roller 424 connected by direct drive to the respective AC motor 430, subsequent (belt) rollers 422 and an end roller 425. The rollers 422 have axle extensions 222A, 222B as do rollers 222. The drive rollers 424 have axle extensions 224A, 224B as does drive roller 224. The end roller 425, has the same dimensions as the other rollers 422. Thus, unless the end roller 425 is a drive roller, it has axle extensions 222A, 222B as do rollers 422.

FIG. 17 also shows the opposed mounting roller bearings 402 and 402A for supporting the rollers 422, 424, 425, 426. This also shows horizontal support 409 for supporting the roller conveyor sections 221.

Figure 18:
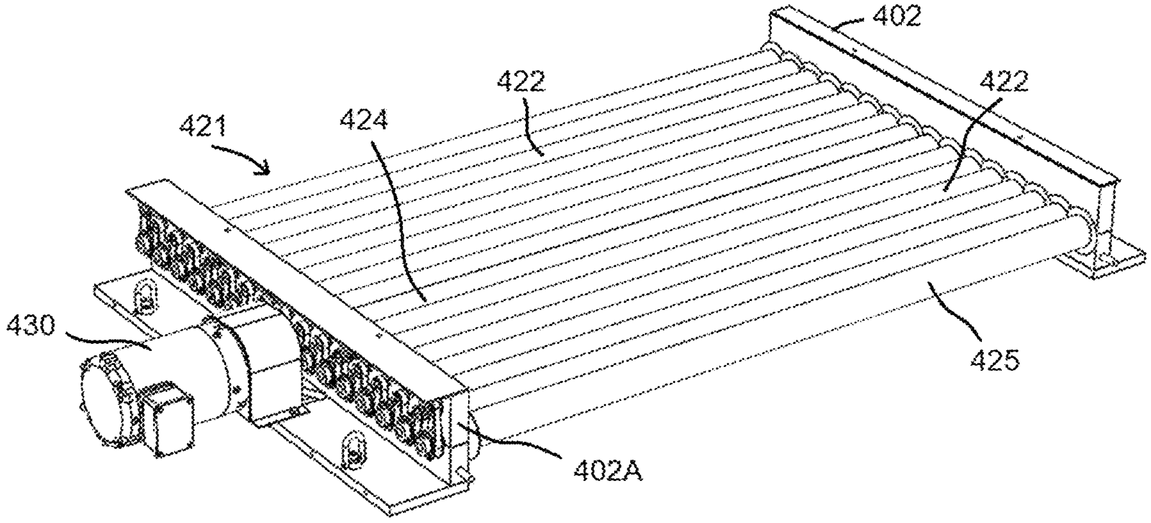
FIG. 18 shows a perspective view of a roller section of the embodiment of FIG. 17.

FIG. 18 shows a perspective view of a roller section 421 of the embodiment of FIG. 21 having the drive roller 424 connected by direct drive to the respective AC motor 430, subsequent (belt) rollers 422 and the end belt roller 425. The drive roller 424 is the middle of a plurality of the rollers 422.

Figure 19:
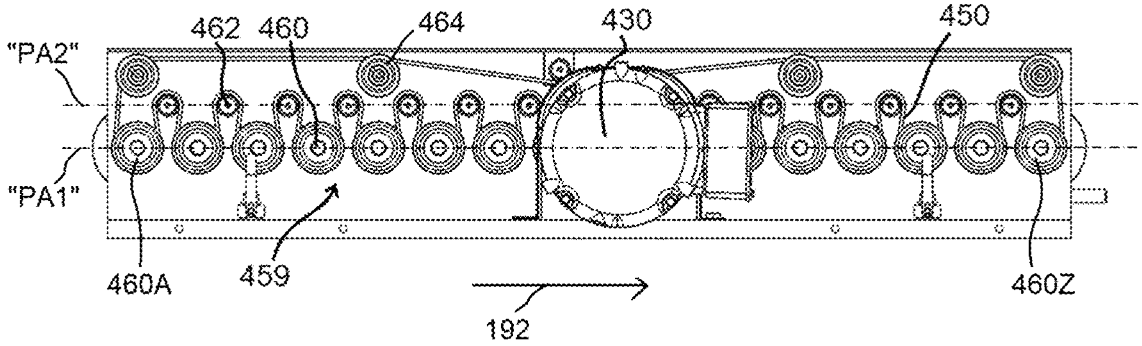
FIG. 19 shows a side view of the roller section of the embodiment of FIG. 17.

FIG. 19 shows a side view of the roller section of the embodiment of FIG. 21. This shows the motor 430 for connecting via a rotating actuator 439 to the drive roller 424 (see FIG. 21). FIG. 19 also shows a single belt drive 459 attached to the rollers 422, 424, 425 for driving the rollers 422, 425. The single belt drive includes a single belt 450, roller pulleys 460 attached to respective rollers 422, 424, 425, and intermediate free spinning pulleys not attached to respective rollers. The single belt drive includes a drive roller pulley 453 (see FIG. 21) for the drive roller 424. This belt drive includes one belt 450 per motor 430. Thus, typically one belt 450 per section 421.

The single belt 450 transmits drive force from the drive roller 424 to the roller pulleys 460 for the other rollers 422, 425 by traveling in a serpentine or sinusoidal path along the roller pulleys 460 and intermediate free spinning pulleys 462. The serpentine or sinusoidal path means that it is a path having a series of up and down curves in arranged in a repeating fashion.

Figure 23:
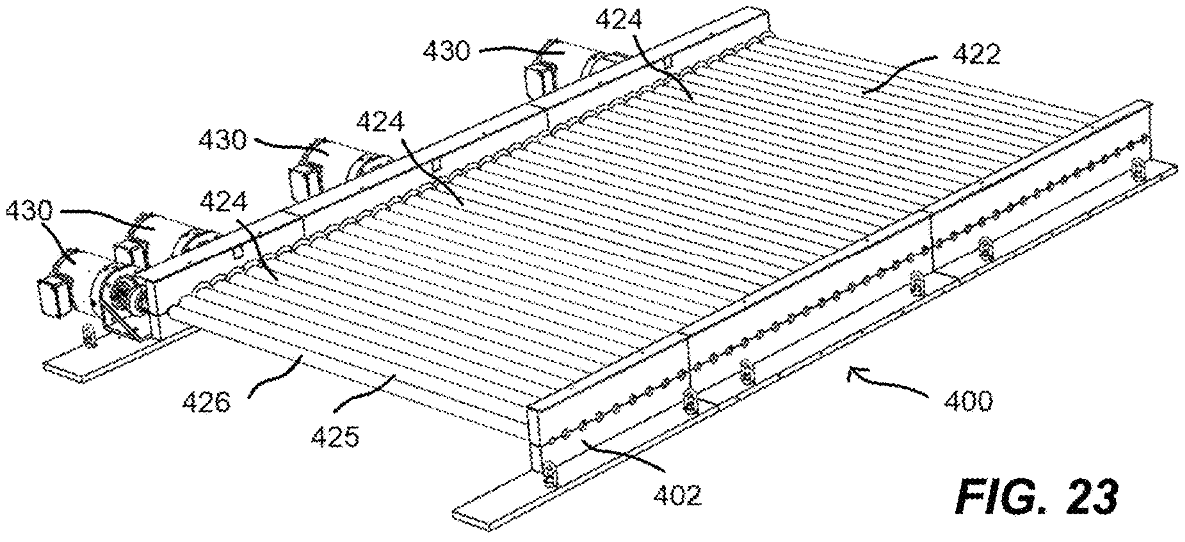
FIG. 23 shows a second perspective view of the second embodiment of FIG. 17 having a roller conveyor having 3 roller sections to be driven all in the same direction by 3 AC motor drives and a discharge roller driven by an AC motor.

The drive roller 424 is connected to its adjacent first belt roller 422 by the first belt drive that travels along a U-shaped path from the drive roller pulley 463, then onto an intermediate free spinning pulley 462, and then to the drive roller pulley 453 of the first belt roller 422. The drive roller 424 and its adjacent first belt roller 422 contact the belt 450 when the belt 450 is at the lowest points of the U-shaped path and the intermediate free spinning pulley 462 contacts the highest point of the U-shaped path as shown in FIG. 23. However, the opposite arrangement (not shown) may also be employed with the drive roller 424 and its adjacent first belt roller 422 contact the belt 450 when the belt 450 is at the highest points of the U-shaped path and the intermediate free spinning pulley 462 contacts the belt 450 when the belt 450 is at the lowest point of the U-shaped path. Typically the roller pulleys 460 have a larger diameter than the intermediate free spinning pulleys 462. The belt 450 also travels across a series of free spinning return rollers 464 as it passes from the pulley 460Z of the end roller 425 back to the pulley 460A of the first roller 222 in section 421.

The first belt roller 422 is connected to its next adjacent second belt roller 422 by the first belt drive that travels along a U-shaped path from a roller pulley 460 connected to a first belt roller 422, then onto the intermediate free spinning pulley 462, and then to the roller pully of the next adjacent second belt roller 422. This repeats until the first belt roller 422 reaches the roller pulley 460 for the end roller 425. Then the belt travels around the pulley 460 of the end roller 425 and returns to the drive roller pulley 463 to form an endless loop. The roller pulleys 460 are aligned along a first pulley axis "PA1" parallel to the machine direction 192. The intermediate free spinning pulleys 462 are aligned along a second pulley axis "PA2" parallel to the machine direction 192. Thus, the first pulley axis "PA1" is parallel to the second pulley axis "PA2".

Figure 20:
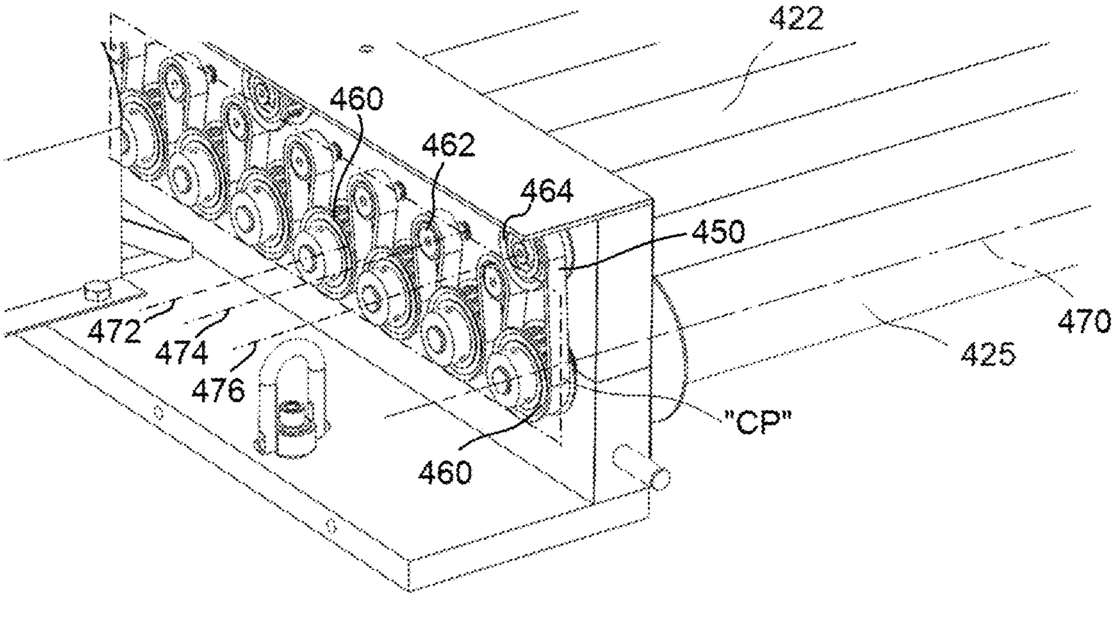
FIG. 20 shows an enlarged perspective view of an end portion of a modular roller section of the second embodiment of the present invention.

FIG. 20 shows an enlarged perspective view of an end portion of a modular roller section 421 of the second embodiment of the present invention. The return pulleys 464, the roller pulleys 460 and the intermediate free spinning pulleys 462 lie in a single transverse common plane "CP".

The transverse common plane "CP" is perpendicular in vertical and horizontal directions to a longitudinal axis 470 of the roller 425 and the pulley 460 of the roller 425, the longitudinal axis 472 of the pulleys 460 of the rollers 422, the longitudinal axis 474 of the intermediate free spinning pulleys 462, the longitudinal axis 476 of the free spinning return pulleys 464. The transverse common plane "CP" is parallel to the machine direction 192.

FIG. 21 shows an enlarged perspective view of a middle portion of a modular roller section of the second embodiment of the present invention. This shows the connection of the rotatable actuator 439 of the motor 430 to the axle extension 224A (FIG. 8A) of the drive roller 424. This also shows the drive roller pully 453. This shows the axle 438 connecting the motor 430 to the drive roller 424. This shows the belt roller 425 having an axis 470. The rollers 422, 424, 425, 426 each has a respective longitudinal axis as do each of rollers 222, 224, 225, 226.

Figure 22:
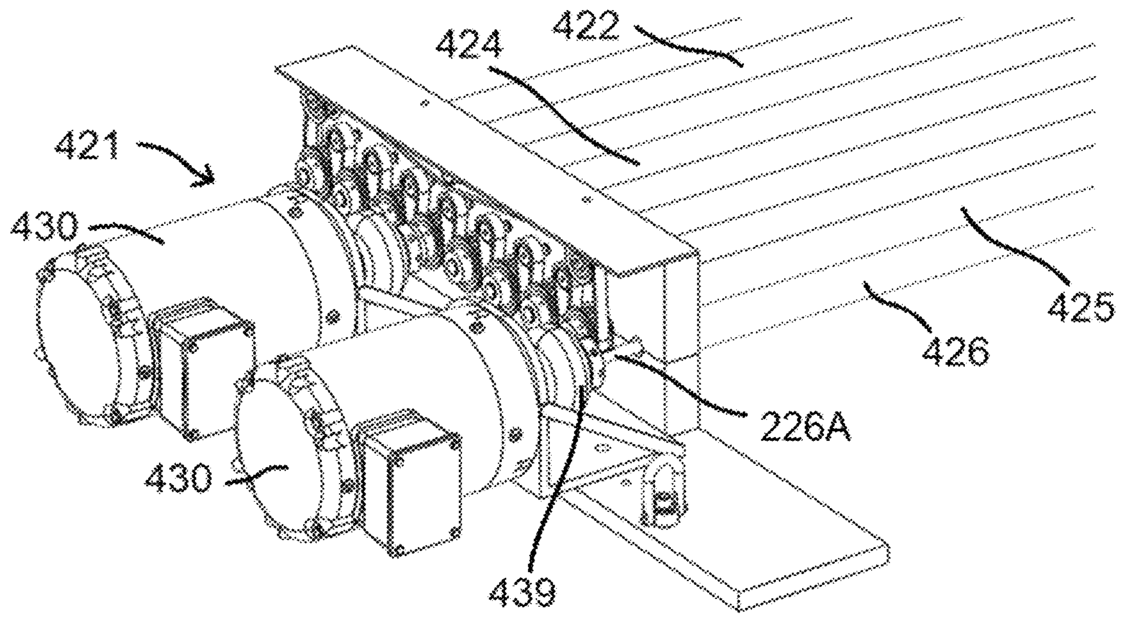
FIG. 22 shows an enlarged perspective view of a discharge end portion of the second embodiment of the present invention.

FIG. 22 shows an enlarged perspective of a discharge end portion of the second embodiment of the present invention of FIG. 17. FIG. 22 shows a roller section 421 including the drive roller 424, belts rollers 422 and end belt roller 425, as well as the AC variable speed motor 430 to power the drive roller 424. This shows the actuator 439 of the motor 430 connected to the axle extension 226A (FIG. 8C) of the end (discharge) roller 426. It also shows the single belt 450 that transmits drive force from the drive roller 224 to the other rollers 422, 425 by a serpentine path of the belt 450 along the roller pulleys 460 attached to respective rollers and intermediate free spinning pulleys 462 not attached to respective rollers, as described in more detail elsewhere in this specification. The end roller 426 is driven by its own AC variable speed motor 430.

FIG. 23 shows a second perspective view of the second embodiment of FIG. 21 having a roller conveyor 400 having 3 roller sections to be driven all in the same direction by 3 AC motor drives 430 and a discharge roller 426 driven by an AC motor 430.

Figure 24:
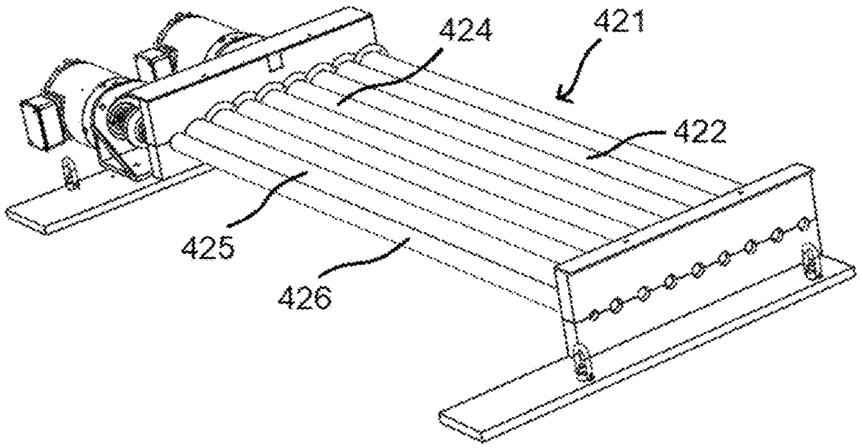
FIG. 24 shows a second perspective view of the roller section of the second embodiment of FIG. 17.

FIG. 24 shows a second perspective view of the end of the roller section 421 of the second embodiment of FIG. 17 showing the drive roller 424, belts rollers 422 and end belt roller 425, as well as the discharge roller 426.

Figure 25:
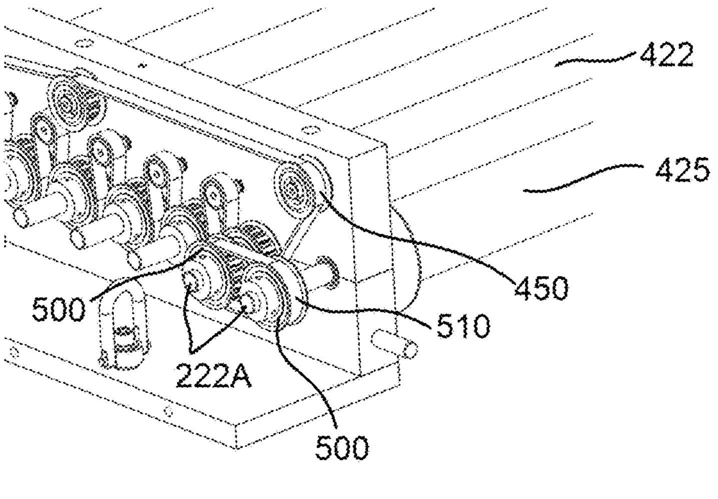
FIG. 25 shows a perspective view of the roller section of a modification of the second embodiment of FIG. 17.
Figure 26:
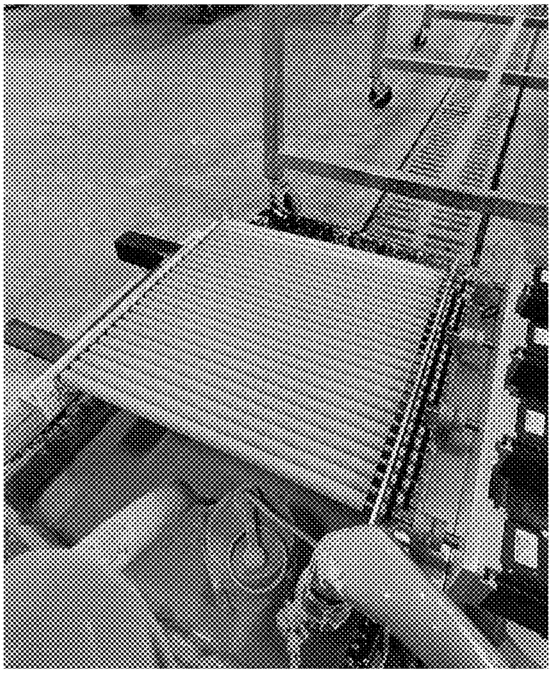
FIGS. 26-29 show photographs of an example of the roller conveyor in operation to distribute gypsum slurry from start to steady state operation.
Figure 27:
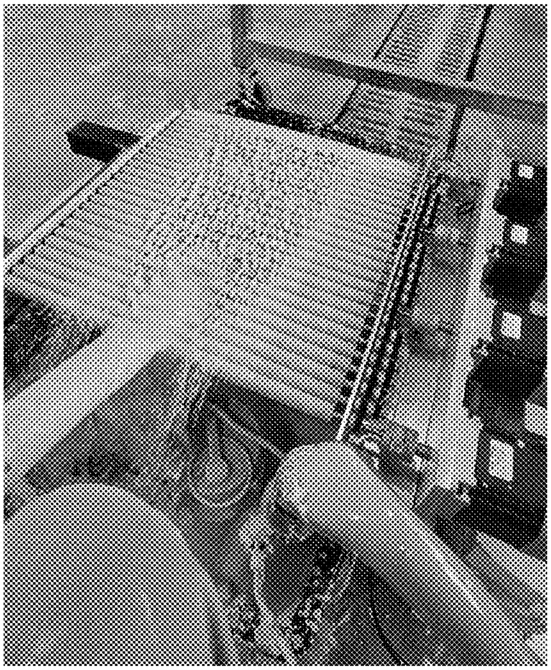
Figure 28:
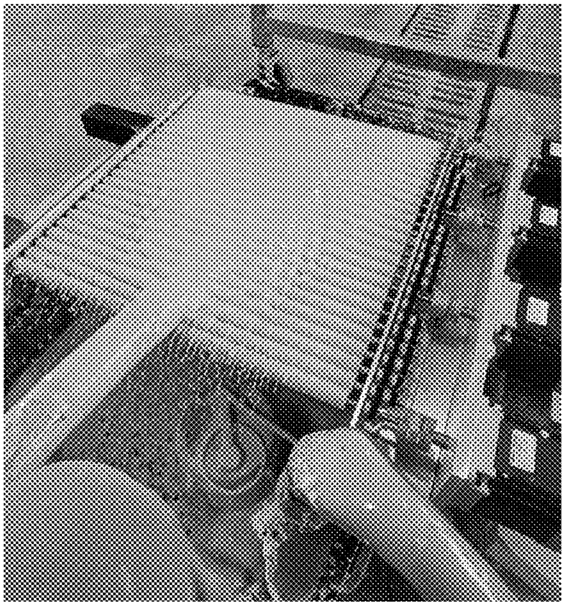
Figure 29:
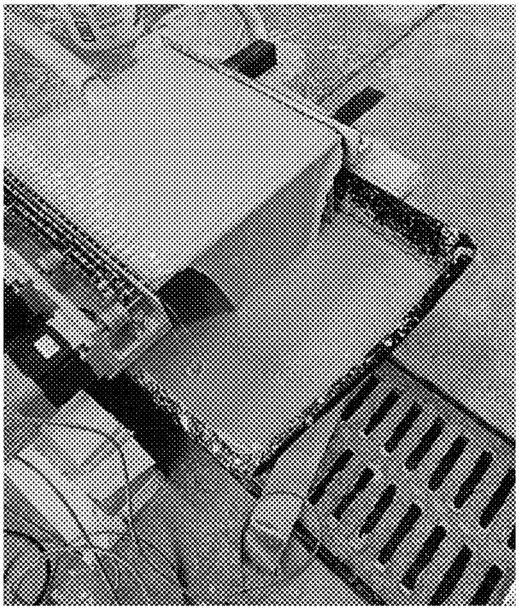

FIG. 25 shows a perspective view of the roller section of a modification of the second embodiment of FIG. 17. FIG. 25 is a view similar to that of FIG. 20 but modified to extend the axle extensions 222A to be sufficiently long to add a second pulley 500 as an outer pulley 500 to two of the axle extensions 222A and a second belt 510 to move around each of the second pulleys 500. The second belt 510 is placed around the two pulleys 500 to contact the two pulleys 500 so that the turning of one pulley 500 drives the other pulley 500. An advantage of this modification is that it permits replacing belt 450 (FIG. 20) that runs around all the pulleys 460, 462, 464 of the section 421 with a shorter belt 450 (FIG. 25) that does not run around one of the roller pulleys 460 and one of the intermediate free spinning pulleys 462. This arrangement of two outer pulleys 500 and second belt 510 is shown at the end of the roller section 421 but may be employed elsewhere with two different rollers 422 of the section 421.

CLAUSES OF THE INVENTION

The following clauses describe various aspects of the present invention.

A1. A slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two, typically two to five, preferably three or four, roller sections, wherein each roller section has three or more, preferably 6 to 20, more preferably 6 to 10, typically 7 or 8, adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises:

a first plurality of pulleys aligned along a first axis and a second plurality of pulleys aligned along a second axis, said first axis is parallel to the said second axis and parallel to a machine direction of the slurry distributing device which is perpendicular to the rollers of the roller section, the first plurality of pulleys and the second plurality of pulleys adapted and configured to rotate while the rollers rotate, a direct drive roller connected by direct drive to its respective variable speed drive for driving the direct drive roller, and a first belt roller connected to its respective direct drive roller by a first belt drive for driving the first belt roller, wherein said first plurality of pulleys comprises a direct drive roller pulley concentrically connected to the direct drive roller and a first belt roller pulley concentrically connected to the first belt roller, wherein the first belt drive comprises:

the direct drive roller pulley, the first belt roller pulley, and a first belt contacting the direct drive roller pulley and the first belt roller pulley; and the slurry distributing device is adapted and configured to then deliver the distributed slurry onto a lower layer, wherein the slurry distributing device actively transports the slurry.

B2. The slurry distributing device of clause A1, wherein each roller section comprises:

a second belt roller connected to its respective first belt roller by:

a) a second belt drive for driving the second belt roller, the second belt drive comprising a second belt, or b) the first belt drive, wherein if the second belt roller is connected to the first belt roller by the first belt drive then the first belt is adapted and configured to travel along a U-shaped path from the first belt roller pulley concentrically connected to the first belt roller, then onto an intermediate free spinning pulley, and then to a second belt roller pulley concentrically connected to the second belt roller, wherein the first belt roller pulley and second belt roller pulley are pulleys of the first plurality of pulleys and aligned along the first axis, the intermediate free spinning pulley is a pulley of the second plurality of pulleys and aligned along the second axis, and the first axis and second axis are in a plane perpendicular to a longitudinal axis of the first belt roller and a longitudinal axis of the second belt roller.

Clause C3. The slurry distributing device according to clause B2, wherein the second belt roller is connected to its respective first belt roller by the second belt drive.

Clause D4. The slurry distributing device according to clause C3, wherein the first belt drive comprises:

the direct drive roller pulley concentrically connected to the direct drive roller, the first belt roller pulley, wherein the first belt roller pulley is a primary pulley of the first belt roller, and the first belt, wherein the first belt is adapted and configured to travel on the direct drive roller pulley and the primary pulley of the first belt roller to rotate the first belt roller; and wherein the second belt drive comprises:

a first belt roller secondary pulley concentrically connected to the first belt roller, wherein the first belt roller secondary pulley is a pulley of the second plurality of pulleys, and a second belt roller secondary pulley concentrically connected to the second belt roller, and the second belt, wherein the second belt travels on the first belt roller secondary pulley and the second belt roller secondary pulley to rotate the second belt roller;

wherein the primary pulleys are aligned along the first axis, the secondary pulleys are aligned along the second axis, and the first axis and second axis, the longitudinal axis of the first belt roller and the longitudinal axis of the second belt roller are aligned in a plane.

Clause E5. The slurry distributing device according to clause B2, wherein the second belt roller is connected to its respective first belt roller by the first belt drive, wherein the first belt travels along the U-shaped path from the first belt roller pulley connected to the first belt roller, then onto the intermediate free spinning pulley, and then to a second belt roller pulley concentrically connected to the second belt roller.

Clause F6. The slurry distributing device according to clause A1, wherein the roller sections are modular such that each roller section in the series of roller sections can be removably attached to another roller section.

Clause G7. The slurry distributing device according to clause A1, wherein the parallel rollers of each roller section are adapted and configured to provide a path for receiving the slurry supplied from the at least one mixing device to be deposited on the parallel rollers and moving the deposited slurry in a delivery direction along a main flow axis that is transverse to the parallel rollers over an upper surface of the parallel rollers while distributing the slurry uniformly over at least a portion of a width of the roller section;

wherein, to deliver the distributed slurry onto the lower layer, the roller conveyor is adapted and configured to be spaced above a forming surface moving in a machine direction along a longitudinal axis to have the slurry fall down from a downstream discharge end of the roller conveyor onto the lower layer.

Clause H8. The slurry distributing device according to clause A1, wherein the parallel rollers are in direct contact with one another.

Clause 19. The slurry distributing device according to clause A1, wherein each roller section has three or more rollers that are equipped to rotate in the delivery direction or alternately against the delivery direction.

Clause J10. The slurry distributing device of clause A1, further comprising a discharge roller in the delivery direction, rotatably mounted on the downstream discharge end of the roller conveyor, adjacent the roller section which is most downstream in the delivery direction, to create a shear point at the downstream discharge end of the roller conveyor for the slurry to exit the roller conveyor and fall (cascade) down from the roller conveyor;

wherein the discharge roller has its own variable speed drive for spinning in a same or different direction, instantaneous tangential velocity, and/or revolutions per minute as the parallel rollers of the roller sections, preferably the discharge roller has a smaller outer diameter than the rollers of the roller sections.

Clause K11. The slurry distributing device according to clause J10, wherein the discharge roller is equipped to rotate against the delivery direction.

Clause L12. The slurry distributing device according to clause J10, wherein the discharge roller is disposed beneath the common plane of the other rollers.

Clause M13. The slurry distributing device according to clause A1, wherein the parallel rollers of each roller section are supported by opposed mounting roller bearings, each said mounting roller bearing has a two part construction including an upper part removably attached to a lower part so the upper part can be lifted off the lower part to access the rollers of the roller section.

Clause N14. A conveyor line for producing gypsum boards, comprising:

a conveying device, at least one mixing device for mixing at least one slurry, and at least one slurry distributing device of any of clauses A11 to M13 comprising a roller conveyer, wherein three or more rollers are disposed in parallel with one another in a common plane such that gussets between the individual rollers are formed for enabling occurrence of backflow of slurry, the three or more rollers are rotatably mounted about their longitudinal axes and are disposed essentially perpendicular to a delivery direction of the slurry;

wherein the at least one slurry distributing device is disposed between a supply device for the slurry and delivery of the slurry, and wherein the at least one slurry distributing device is equipped to adapt a speed of the slurry to a conveying device speed and to deliver the slurry supplied from the at least one mixing device essentially uniformly onto a lower layer, wherein the lower layer is the conveying device itself or a casing material lying on the conveying device, and preferably fed continuously, wherein the at least one slurry distributing device is equipped to actively transport the slurry.

Clause O15. The conveyor line of clause N14, wherein the at least one mixing device is adapted and configured to agitate water and a gypsum material to form an aqueous gypsum slurry;

wherein a delivery conduit is in fluid communication with the at least one mixing device, the delivery conduit including a common delivery trunk adapted to receive a main flow of aqueous gypsum slurry from the at least one mixing device;

wherein the roller conveyor is in fluid communication with the common delivery trunk.

Clause P16. The conveyor line according to clause N14, wherein a discharge height of the slurry from the at least one slurry distributing device onto a surface of the lower layer is 2 to 20 cm, typically 2 to 10 cm.

Clause Q17. The conveyor line according to clause N14, wherein a plurality of slurry distributing devices are disposed one after the other, by means of which identically or differently constituted slurries are delivered onto the lower layer.

Clause R18. The conveyor line according to any of clauses N14 to Q17, comprising:

a forming surface for depositing thereon a front first cover sheet, having first and second opposed surfaces, and moving the front first cover sheet horizontally in a machine direction along the forming surface;

a source of a first aqueous gypsum slurry for depositing the first aqueous gypsum slurry on the front first cover sheet moving in the machine direction to form a first aqueous gypsum slurry layer as a higher-density region in layer form contacting an upper surface of the front cover sheet;

a source of a second aqueous gypsum slurry in a foamed state for depositing the second aqueous gypsum slurry onto a roller conveyor of clause 1, to deposited on parallel rotatably mounted rollers of the roller conveyor and then pass over the parallel rollers in a machine direction along a main flow axis and transverse to the parallel rollers, wherein the roller conveyor is spaced a distance above over the first aqueous gypsum slurry layer to deliver the slurry downwardly from a downstream discharge end of the roller conveyor, in a waterfall-like fashion, to the moving upper surface of the first aqueous gypsum slurry layer moving in the machine direction on the forming surface, to form a second aqueous gypsum slurry layer as a lower-density region in layer form contacting the upper surface of the first aqueous gypsum slurry layer;

a source of a back second cover sheet adapted and configured to place the back second cover sheet over the second aqueous gypsum slurry layer to make a multilayer assembly including the front first cover sheet, the first aqueous gypsum slurry layer on the first cover sheet, the second aqueous gypsum slurry layer on the first aqueous gypsum slurry layer, and the back second cover sheet over the second aqueous gypsum slurry layer;

a forming station for forming the multilayer assembly, wherein preferably the forming station comprises a forming plate for passing the multilayer assembly under the forming plate of the forming station; and a location for respectively setting the calcium sulfate hemihydrate of the first aqueous gypsum slurry layer, and the second aqueous gypsum slurry layer by respectively reacting the calcium sulfate hemihydrate with the water of the first aqueous gypsum slurry layer, and the second aqueous gypsum slurry layer, to form a panel comprising a gypsum core respectively of a first board layer comprising calcium sulfate dihydrate, and a second board layer comprising calcium sulfate dihydrate between the front first cover sheet and back second cover sheet;

wherein the first board layer has a first board layer density, wherein the second board layer has a second board layer density lower than the first board layer density;

a cutting station for cutting the panel into the gypsum board; and a drying station for drying the gypsum board.

Clause S19. A method for the use of the slurry distributing device according to any of clauses A1 to M13, comprising the roller conveyer, including producing gypsum plasterboards in a continuous process.

Clause T20. The method of clause S19, comprising:

agitating water and cementitious material to form an aqueous cementitious material slurry in the at least one mixing device;

passing the aqueous cementitious slurry through a delivery conduit in fluid communication with the at least one mixing device, the delivery conduit including a common delivery trunk adapted to receive a main flow of aqueous cementitious slurry from the mixer;

depositing the aqueous cementitious slurry from the common delivery trunk onto an upper surface of the roller conveyor and moving the aqueous cementitious slurry in a machine direction along a main flow axis on the upper surface of the roller conveyor to spread and level the deposited aqueous cementitious slurry on parallel rotatably mounted rollers of the rolling system, then at a downstream discharge end of the roller conveyor passing the aqueous cementitious slurry over the downstream discharge end of the roller conveyor spaced a distance above a moving surface of to deposit at least a majority by weight of the aqueous cementitious slurry on the moving surface, to form a layer of the aqueous cementitious slurry contacting an upper surface of the moving surface.

Clause U21. The method of clause S19, comprising:

depositing a front first cover sheet, having first and second opposed surfaces, over a forming surface and moving the front first cover sheet horizontally in a machine direction along the forming surface;

depositing a first aqueous gypsum slurry on the front first cover sheet moving in the machine direction to form a first aqueous gypsum slurry layer as a higher-density region in layer form contacting an upper surface of the front first cover sheet, depositing a second aqueous gypsum slurry (core slurry) in a foamed state on the roller conveyor and moving the deposited second aqueous gypsum slurry in the machine direction along a main flow axis on the upper surface of the parallel rollers of the roller conveyor to spread and level the deposited second aqueous gypsum slurry on the parallel rollers of the roller conveyor, wherein each roller section of the roller conveyor, having the respective variable speed drive, drives the parallel rollers of the roller sections all in the same direction to control the spread of the second aqueous gypsum slurry to spread and level the second aqueous gypsum slurry passing over the parallel rollers, then at a downstream discharge end of the roller conveyor passing the second aqueous gypsum slurry over a downstream discharge end of the roller conveyor spaced a distance above the higher-density region on the front cover sheet to deposit at least a majority by weight of the second aqueous gypsum slurry on the higher-density region on the front cover sheet, to form a layer of the second aqueous gypsum slurry in a foamed state as a lower-density region in layer form contacting an upper surface of the higher density region, the higher-density region having a higher density than the lower-density region;

then depositing a back cover sheet on the second layer aqueous gypsum slurry over the front cover sheet to make a multilayer assembly including the first aqueous gypsum slurry layer on the front cover sheet, the second aqueous gypsum slurry layer on the first aqueous gypsum slurry layer, and the back cover sheet on the second portion of aqueous gypsum slurry layer;

wherein the first aqueous slurry and the second aqueous slurry each comprise a respective mixture of water and stucco, wherein the stucco comprises calcium sulfate hemihydrate, wherein the first aqueous slurry and the second aqueous slurry each comprise a respective mixture of at least 60 wt. % said calcium sulfate hemihydrate on a dry (water free) basis, and the water at a weight ratio of water to the calcium sulfate hemihydrate of 0.2:1 to 1.2:1;

passing the multilayer assembly into a forming station for forming the multilayer assembly;

setting the calcium sulfate hemihydrate of the respective aqueous gypsum slurry layer and second aqueous gypsum slurry layer by reacting the calcium sulfate hemihydrate with the water of the respective first aqueous slurry layer and the second aqueous gypsum slurry layer to form a panel comprising a gypsum core of respective first and second board layers comprising calcium sulfate dihydrate between the front cover sheet and the back cover sheet;

wherein the first board layer comprises a set higher-density region as a layer comprising calcium sulfate dihydrate and has a first board layer density;

wherein the second board layer comprises a set lower-density region as a layer comprising calcium sulfate dihydrate and has a second board layer density lower than the first board layer density, the set higher-density region being interposed between the set lower-density region and the front cover sheet; and drying the panel and cutting the panel into the gypsum board.

Clause V22. The method of any of clauses S19 to U21, wherein an average velocity of the slurry discharged from the roller conveyor is less than 50% of an average velocity of the main flow of aqueous cementitious slurry discharged onto the roller conveyor.

Clause W23. A slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two, typically two to five, preferably three or four, roller sections, wherein each roller section has three or more, preferably 6 to 10, typically 7 or 8, adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises a direct drive roller connected by direct drive to its respective variable speed drive for driving the direct drive roller, and a first belt roller connected to its respective direct drive roller by a first belt drive, and a second belt roller connected to its respective first belt roller by second belt drive; and the slurry distributing device is adapted and configured to then deliver the distributed slurry onto a lower layer, wherein the slurry distributing device actively transports the slurry.

EXAMPLE

FIGS. 26-29 show photographs of an example of the roller conveyor in operation to distribute gypsum slurry in sequence from start to steady state operation.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises:

a first plurality of pulleys aligned along a first axis and a second plurality of pulleys aligned along a second axis, said first axis is parallel to the said second axis and parallel to a machine direction of the slurry distributing device which is perpendicular to the rollers of the roller section, the first plurality of pulleys and the second plurality of pulleys adapted and configured to rotate while the rollers rotate, a direct drive roller connected by direct drive to its respective variable speed drive for driving the direct drive roller, and a first belt roller connected to its respective direct drive roller by a first belt drive for driving the first belt roller, wherein said first plurality of pulleys comprises a direct drive roller pulley concentrically connected to the direct drive roller and a first belt roller pulley concentrically connected to the first belt roller, a second belt roller connected to its respective first belt roller by:

a) a second belt drive for driving the second belt roller, the second belt drive comprising a second belt, or b) the first belt drive, wherein if the second belt roller is connected to the first belt roller by the first belt drive then the first belt is adapted and configured to travel along a U-shaped path from the first belt roller pulley concentrically connected to the first belt roller, then onto an intermediate free spinning pulley, and then to a second belt roller pulley concentrically connected to the second belt roller, wherein the first belt roller pulley and second belt roller pulley are pulleys of the first plurality of pulleys and aligned along the first axis, the intermediate free spinning pulley is a pulley of the second plurality of pulleys and aligned along the second axis, and the first axis and second axis are in a plane perpendicular to a longitudinal axis of the first belt roller and a longitudinal axis of the second belt roller wherein the first belt drive comprises:

the direct drive roller pulley, the first belt roller pulley, and a first belt contacting the direct drive roller pulley and the first belt roller pulley;

and the slurry distributing device is adapted and configured to then deliver the distributed slurry onto a lower layer, wherein the slurry distributing device actively transports the slurry.

2. The slurry distributing device according to claim 1, wherein the second belt roller is connected to its respective first belt roller by the second belt drive.

3. The slurry distributing device according to claim 2, wherein the first belt drive comprises:

the direct drive roller pulley concentrically connected to the direct drive roller, the first belt roller pulley, wherein the first belt roller pulley is a primary pulley of the first belt roller, and the first belt, wherein the first belt is adapted and configured to travel on the direct drive roller pulley and the primary pulley of the first belt roller to rotate the first belt roller; and wherein the second belt drive comprises:

a first belt roller secondary pulley concentrically connected to the first belt roller, wherein the first belt roller secondary pulley is a pulley of the second plurality of pulleys, and a second belt roller secondary pulley concentrically connected to the second belt roller, and the second belt, wherein the second belt travels on the first belt roller secondary pulley and the second belt roller secondary pulley to rotate the second belt roller;

wherein the primary pulleys are aligned along the first axis, the secondary pulleys are aligned along the second axis, and the first axis and second axis, the longitudinal axis of the first belt roller and the longitudinal axis of the second belt roller are aligned in a plane.

4. The slurry distributing device according to claim 1, wherein the second belt roller is connected to its respective first belt roller by the first belt drive, wherein the first belt travels along the U-shaped path from the first belt roller pulley connected to the first belt roller, then onto the intermediate free spinning pulley, and then to a second belt roller pulley concentrically connected to the second belt roller.

5. A slurry distributing device comprising:

a roller conveyer comprising:

a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises:

a first plurality of pulleys aligned along a first axis and a second plurality of pulleys aligned along a second axis, said first axis is parallel to the said second axis and parallel to a machine direction of the slurry distributing device which is perpendicular to the rollers of the roller section, the first plurality of pulleys and the second plurality of pulleys adapted and configured to rotate while the rollers rotate, a direct drive roller connected by direct drive to its respective variable speed drive for driving the direct drive roller, and a first belt roller connected to its respective direct drive roller by a first belt drive for driving the first belt roller, wherein said first plurality of pulleys comprises a direct drive roller pulley concentrically connected to the direct drive roller and a first belt roller pulley concentrically connected to the first belt roller, wherein the first belt drive comprises:

the direct drive roller pulley, the first belt roller pulley, and a first belt contacting the direct drive roller pulley and the first belt roller pulley;

wherein the parallel rollers of each roller section are supported by opposed mounting roller bearings, each said mounting roller bearing has a two part construction including an upper part removably attached to a lower part so the upper part can be lifted off the lower part to access the rollers of the roller section and the slurry distributing device is adapted and configured to then deliver the distributed slurry onto a lower layer, wherein the slurry distributing device actively transports the slurry.

6. A method for the use of a slurry distributing device comprising a roller conveyer, a support frame;

parallel rollers, disposed in parallel with one another in a common and rotatably mounted about their longitudinal axes in the support frame and disposed essentially perpendicular to a delivery direction of the slurry;

wherein the slurry distributing device is adapted and configured to be supplied with the slurry from at least one mixing device, and to adapt a speed of the slurry to a conveying device speed and to distribute the slurry uniformly over a desired width of an upper surface of the rollers, the parallel rollers are provided in a series of at least two adjacent said parallel rollers, wherein each roller section has a respective variable speed drive for driving the rollers of the respective roller section all in the same direction and controlling rotation speed of the rollers of the respective roller section to control spread of the slurry, as the slurry moves over the upper surface of the parallel rollers, to distribute and level the slurry, wherein each roller section comprises:

a first plurality of pulleys aligned along a first axis and a second plurality of pulleys aligned along a second axis, said first axis is parallel to the said second axis and parallel to a machine direction of the slurry distributing device which is perpendicular to the rollers of the roller section, the first plurality of pulleys and the second plurality of pulleys adapted and configured to rotate while the rollers rotate, a direct drive roller connected by direct drive to its respective variable speed drive for driving the direct drive roller, and a first belt roller connected to its respective direct drive roller by a first belt drive for driving the first belt roller, wherein said first plurality of pulleys comprises a direct drive roller pulley concentrically connected to the direct drive roller and a first belt roller pulley concentrically connected to the first belt roller, a second belt roller connected to its respective first belt roller by:

a) a second belt drive for driving the second belt roller, the second belt drive comprising a second belt, or b) the first belt drive, wherein if the second belt roller is connected to the first belt roller by the first belt drive then the first belt is adapted and configured to travel along a U-shaped path from the first belt roller pulley concentrically connected to the first belt roller, then onto an intermediate free spinning pulley, and then to a second belt roller pulley concentrically connected to the second belt roller, wherein the first belt roller pulley and second belt roller pulley are pulleys of the first plurality of pulleys and aligned along the first axis, the intermediate free spinning pulley is a pulley of the second plurality of pulleys and aligned along the second axis, and the first axis and second axis are in a plane perpendicular to a longitudinal axis of the first belt roller and a longitudinal axis of the second belt roller;

wherein the first belt drive comprises:

the direct drive roller pulley, the first belt roller pulley, and a first belt contacting the direct drive roller pulley and the first belt roller pulley; and the slurry distributing device is adapted and configured to then deliver the distributed slurry onto a lower layer, wherein the slurry distributing device actively transports the slurry, including producing gypsum plasterboards in a continuous process.

* * * * *